United States Patent
Chen et al.

(10) Patent No.: US 10,419,757 B2
(45) Date of Patent: Sep. 17, 2019

(54) CROSS-COMPONENT FILTER

(71) Applicant: QUALCOMM Incorporated, San Diego, CA (US)

(72) Inventors: Yi-Wen Chen, San Diego, CA (US); Wei-Jung Chien, San Diego, CA (US); Li Zhang, San Diego, CA (US); Hsiao-Chiang Chuang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/691,287

(22) Filed: Aug. 30, 2017

(65) Prior Publication Data

US 2018/0063527 A1    Mar. 1, 2018

Related U.S. Application Data

(60) Provisional application No. 62/381,978, filed on Aug. 31, 2016.

(51) Int. Cl.

| | |
|---|---|
| *H04N 19/102* | (2014.01) |
| *H04N 19/105* | (2014.01) |
| *H04N 19/126* | (2014.01) |
| *H04N 19/132* | (2014.01) |
| *H04N 19/117* | (2014.01) |
| *H04N 19/124* | (2014.01) |
| *H04N 19/182* | (2014.01) |
| *H04N 19/186* | (2014.01) |

(Continued)

(52) U.S. Cl.
CPC ......... *H04N 19/117* (2014.11); *H04N 19/124* (2014.11); *H04N 19/182* (2014.11); *H04N 19/186* (2014.11); *H04N 19/513* (2014.11); *H04N 19/635* (2014.11); *H04N 19/80* (2014.11); *H04N 19/82* (2014.11)

(58) Field of Classification Search
CPC .. H04N 19/102; H04N 19/105; H04N 19/126; H04N 19/132
USPC ....................................................... 375/240.02
See application file for complete search history.

(56) References Cited

U.S. PATENT DOCUMENTS

2013/0266057 A1* 10/2013 Kokaram ............. H04N 19/117
                                                                                    375/240.02
2016/0219283 A1    7/2016 Chen et al.

FOREIGN PATENT DOCUMENTS

WO    2016066028 A1    5/2016

OTHER PUBLICATIONS

Fu et al., "Sample Adaptive Offset in the HEVC Standard", IEEE Transactions on Circuits and Systems for Video Technology, vol. 22, No. 12, Dec. 2012, pp. 1755-1762.*

(Continued)

*Primary Examiner* — Dominic D Saltarelli
(74) *Attorney, Agent, or Firm* — Shumaker & Sieffert, P.A.

(57) ABSTRACT

A video coding device generates first and second components of a current picture. Additionally, the video coding device determines a first parameter and a second parameter. The first and second parameters are each based on a value of a current sample in the first component. The video coding device applies a cross-component filter to the current sample, thereby determining a filtered value of the current sample based on the first parameter, the second parameter, and one or more cross-component samples. Each of the one or more cross-component samples is in the second component.

30 Claims, 14 Drawing Sheets

(51) Int. Cl.
  *H04N 19/513* (2014.01)
  *H04N 19/80* (2014.01)
  *H04N 19/82* (2014.01)
  *H04N 19/635* (2014.01)

(56) References Cited

OTHER PUBLICATIONS

Chen et al., "Algorithm description of Joint Exploration Test Model 3 (JEM3)", JVET Meeting; May 26-Jun. 1, 2016; Geneva; The Joint Video Exploration Team of ISO/IEC JTC1/SC29/WG11 and ITU-T SG.16; No. JVET-C1001, Jul. 2, 2016, XP030150223, 38 pp.
Chen et al., "CE6.a.4: Chroma intra prediction by reconstructed luma samples", Joint Collaborative Team on Video Coding (JCT-VC) of ITU-T SC16 WP3 and ISO/IEC JTC1/SC29/WG11; 5th Meeting: Geneva, Mar. 16-23, 2011, No. JCTVC-E266, Mar. 10, 2011, XP030008772, 7 pp.
Chen et al., "Chroma Intra Prediction by Scaled Luma Samples Using Integer Operations", JCT-VC Meeting; MPEG Meeting; Oct. 7-15, 2010; Guangzhou; Joint Collaborative Team on Video Coding of ISO/IEC JTC1/SC29/WG11 and ITU-T SG.16, No. JCTVC-C2062 Oct. 2, 2010, XP030007913, 7 pp.
International Search Report and Written Opinion of International Application No. PCT/US2017/049688, dated Nov. 17, 2017, 20 pp.
Pu et al., "Cross Component Decorrelation for HEVC Range Extension Standard", 2014 IEEE International Conference on Image Processing (ICIP), Oct. 27, 2014, 5 pp.
Zhang et al., "EE5: Enhanced Cross-component Linear Model Intra-Prediction", 5th JVET Meeting; Jan. 12-20, 2017; Geneva; The Joint Video Exploration Team of ISO/IEC JTC1/SC29/WG11 and ITU-T SG.16; No. JVET-E0077, Jan. 4, 2017, XP030150563, 4 pp.
Zhang et al., "Enhanced Cross-component Linear Model Intra-Prediction", 4th JVET Meeting; Oct. 15-21, 2016; Chengdu; The Joint Video Exploration Team of ISO/IEC JTC1/SC29/WG11 and ITU-T SG.16; No. JVET-D0110-v4, Oct. 17, 2016, XP030150355, 6 pp.
Chen et al., "Algorithm description of Joint Exploration Test Model 2", Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B1001, Mar. 2016, 32 pp.
ITU-T H.261, Line Transmission of Non-Telephone Signals, Video Codec for Audiovisual Services at px64 kbits, The International Telecommunication Union, Mar. 1993, 29 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
ITU_T H.223, Series H: Audiovisual and Multimedia Systems, Infrastructure of audiovisual services—Transmission of multiplexing and synchronization, Multiplexing protocol for low bit rate multimedia communication, The International Telecommunication Union, Jul. 2001, 74 pp.
Karczewicz et al., "Improvements on adaptive loop filter", Exploration Team (JVET) of ITU-T SG 16 WP 3 and ISO/IEC JTC 1/SC 29/WG 11, 2nd Meeting: San Diego, USA, Feb. 20-26, 2016, JVET-B0060_r1, Feb. 19, 2016, 6 pp.
Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011, 223 pp.
Chen et al., "Coding tools investigation for next generation video coding", Telecommunication Standardization Sector, International Telecommunication Union, SG16-Geneva-C806, COM 16-C 806-E, Jan. 2015, 7 pp.
"Golomb Coding", Wikipedia, the free encyclopedia, retrieved from https://en.wikipedia.org/wiki/Golomb_coding, Dec. 12, 2017, 7 pp.
"Bilateral Filter", Wikipedia, the free encyclopedia, retrieved from https://en.wikipedia.org/wiki/Bilateral_filter, Dec. 12, 2017, 4 pp.
Reply to Written Opinion from corresponding PCT Application Serial No. PCT/US2017/049688 filed on Jun. 25, 2018 (8 pp).
Second Written Opinion from corresponding PCT Application Serial No. PCT/US2017/04688 dated Jul. 25, 2018 (13 pp).
International Preliminary Report on Patentability from International Application No. PCT/US2017/049688, dated Oct. 22, 2018, 14 pp.

\* cited by examiner

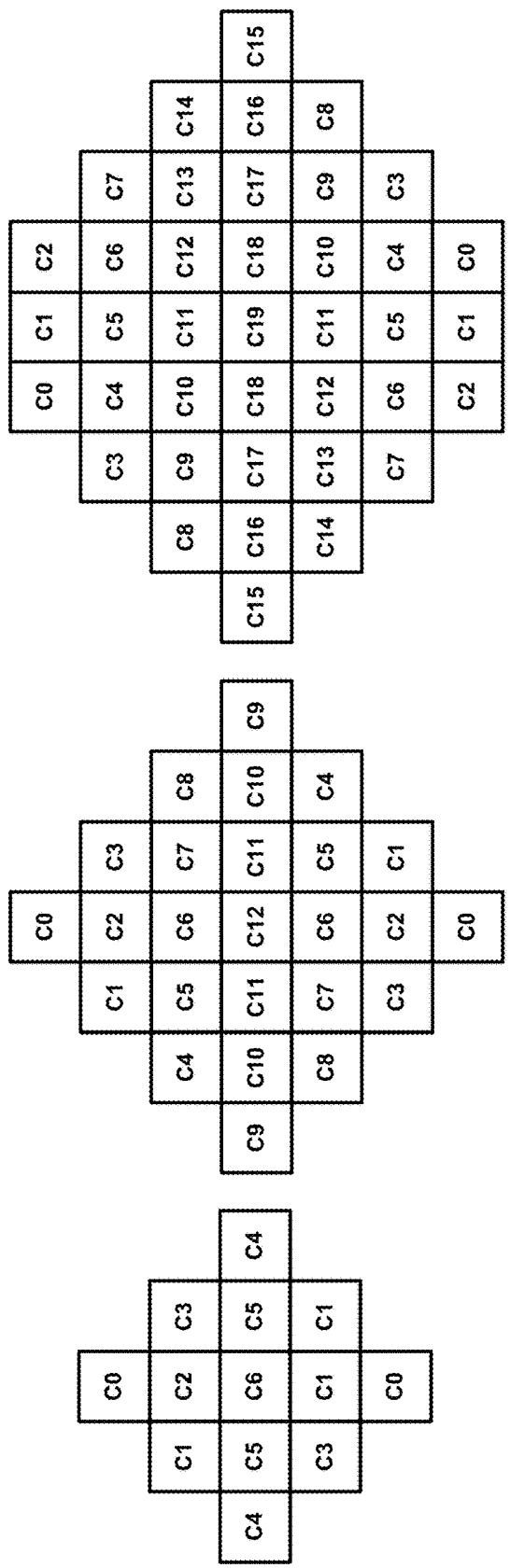

◯ Location of luma sample
X Location of chroma sample

CROSS-COMPONENT FILTER

This application claims the benefit of U.S. Provisional Application 62/381,978, filed Aug. 31, 2016, the entire content of which is incorporated by reference.

TECHNICAL FIELD

This disclosure relates to devices for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to filtering one color component of a video sequence using information of at least one other color component of the video sequence. For example, a video coding device may apply a cross-component filter to determine a filtered value of a current sample. In this example, the video coding device determines the filtered value based on a first parameter, a second parameter, and one or more cross-component samples. The cross-component samples are of a different color component of the current picture than the current sample. For instance, the cross-component samples may be luma samples, and the current sample may be a chroma sample. In accordance with a technique of this disclosure, the first and second parameters are based at least in part on the value of the current sample.

In one example, this disclosure describes a method of coding video data performed by a video coding device, the method comprising: generating a first component of a current picture of the video data, the first component comprising a first array of samples; generating a second component of the current picture, the second component comprising a second array of samples separate from the first array of samples; determining a first parameter, wherein the first parameter is based on a value of a current sample in the first component of the current picture; determining a second parameter, wherein the second parameter is based on the value of the current sample; applying a cross-component filter to the current sample, thereby determining a filtered value of the current sample, wherein the cross-component filter is based on the first parameter, the second parameter, and one or more cross-component samples, each of the one or more cross-component samples being in the second component of the current picture; and performing one or more actions in a group consisting of: outputting a final version of the current picture, wherein a value of a pixel in the final version of the current picture is based on the filtered value of the current sample; and using the final version of the current picture as a reference picture in encoding a later picture of the video data, wherein a value of a pixel in the final version of the current picture is based on the filtered value of the current sample.

In another example, this disclosure describes a device for coding video data, the device comprising: a memory configured to store the video data; and one or more processors configured to: generate a first component of a current picture of the video data, the first component comprising a first array of samples; generate a second component of the current picture, the second component comprising a second array of samples separate from the first array of samples; determine a first parameter, wherein the first parameter is based on a value of a current sample in the first component of the current picture; determine a second parameter, wherein the second parameter is based on the value of the current sample; apply a cross-component filter to the current sample, thereby determining a filtered value of the current sample, wherein the cross-component filter is based on the first parameter, the second parameter, and one or more cross-component samples, each of the one or more cross-component samples being in the second component of the current picture; and perform one or more actions in a group consisting of: outputting a final version of the current picture, wherein a value of a pixel in the final version of the current picture is based on the filtered value of the current sample; and using the final version of the current picture as a reference picture in encoding a later picture of the video data, wherein a value of a pixel in the final version of the current picture is based on the filtered value of the current sample.

In another example, this disclosure describes a device for coding video data, the device comprising: means for generating a first component of a current picture of the video data, the first component comprising a first array of samples; means for generating a second component of the current picture, the second component comprising a second array of samples separate from the first array of samples; means for determining a first parameter, wherein the first parameter is based on a value of a current sample in the first component of the current picture; means for determining a second parameter, wherein the second parameter is based on the value of the current sample; means for applying a cross-component filter to the current sample, thereby determining a filtered value of the current sample, wherein the cross-component filter is based on the first parameter, the second parameter, and one or more cross-component samples, each of the one or more cross-component samples being in the second component of the current picture; and means for performing one or more actions in a group consisting of: outputting a final version of the current picture, wherein a value of a pixel in the final version of the current picture is based on the filtered value of the current sample; and using the final version of the current picture as a reference picture in encoding a later picture of the video data, wherein a value of a pixel in the final version of the current picture is based on the filtered value of the current sample.

In another example, this disclosure describes a computer-readable storage medium having instructions stored thereon, wherein execution of the instructions causes a video coding device to: generate a first component of a current picture of the video data, the first component comprising a first array of samples; generate a second component of the current picture, the second component comprising a second array of samples separate from the first array of samples; determine a first parameter, wherein the first parameter is based on a value of a current sample in the first component of the current picture; determine a second parameter, wherein the second parameter is based on the value of the current sample; apply a cross-component filter to the current sample, thereby determining a filtered value of the current sample, wherein the cross-component filter is based on the first parameter, the second parameter, and one or more cross-component samples, each of the one or more cross-component samples being in the second component of the current picture; and perform one or more actions in a group consisting of: outputting a final version of the current picture, wherein a value of a pixel in the final version of the current picture is based on the filtered value of the current sample; and using the final version of the current picture as a reference picture in encoding a later picture of the video data, wherein a value of a pixel in the final version of the current picture is based on the filtered value of the current sample.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 3A is a conceptual diagram illustrating an example 5×5 diamond filter shape.

FIG. 3B is a conceptual diagram illustrating an example 7×7 diamond filter shape.

FIG. 3C is a conceptual diagram illustrating an example truncated 9×9 diamond filter shape.

DETAILED DESCRIPTION

Figure 1:
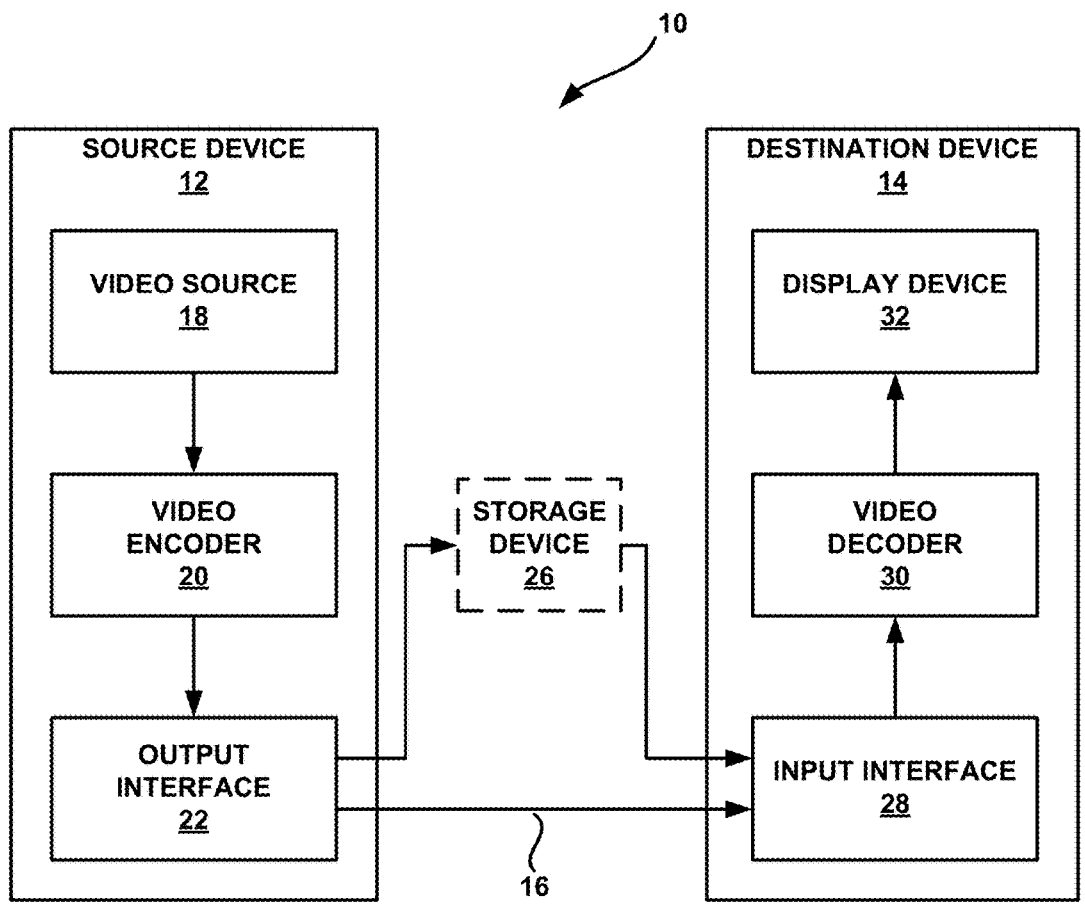
FIG. 1 is a block diagram illustrating an example video encoding and decoding system that may utilize the techniques described in this disclosure.

Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder may also perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder.

This disclosure describes techniques associated with filtering reconstructed video data in video encoding and/or video decoding processes and, more particularly, this disclosure describes techniques related to a cross-component in-loop filter in a video coding system. In accordance with this disclosure, filtering is applied at a video encoder, and filter information, such as parameters, may be encoded (either directly or implicitly) in a bitstream to enable a video decoder to identify the filtering that was applied at the video encoder. An initial pixel value for a current pixel $P^c$ may be modified by the video decoder to a modified pixel $P'^c$ according to a predefined linear or non-linear relation between the current pixel and its spatial neighboring pixels and at least one corresponding pixels in the at least one other components. The video decoder receives encoded video data that includes the filter information, decodes the video data, and applies filtering based on the filtering information. In this way, the video decoder may apply the same filtering that was applied at the video encoder.

This disclosure describes techniques related to filtering of one component of a video sequence using the information of at least one of the other components. For instance, this disclosure describes filter operations and the side information for transmitting the control parameters of the filter. The techniques described herein may be used with advanced video codecs, such as extensions of HEVC or the next generation of video coding standards.

As used in this disclosure, the term video coding generically refers to either video encoding or video decoding. Thus, the term "video coding device" may refer to a device that performs video encoding and/or video decoding. Moreover, certain techniques described in this disclosure with respect to video encoding or video decoding may also apply to the other video decoding or video encoding. As one example, a video encoder may apply the same filtering applied by a video decoder for purposes of testing various encoding hypotheses and for storing decoded pictures for future use as reference pictures.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some examples, source device 12 and destination device 14 are equipped for wireless communication.

Destination device 14 may receive the encoded video data to be decoded via a link 16. Link 16 may comprise any type of medium or device capable of moving the encoded video data from source device 12 to destination device 14. In one example, link 16 comprises a communication medium that enables source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, output interface 22 may output encoded data to a storage device 26. Similarly, input interface 26 may access encoded data from storage device 26. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, a local disk drive, or other types of computer-readable storage media. Destination device 14 may access the encoded video data through any standard data connection, such as an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or may be external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as High Efficiency Video Coding (HEVC) standard. Alternatively, video encoder 20 and video decoder 30 may operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. An algorithm for Joint Exploration Model (JEM) 2 is described in J. Chen, E. Alshina, G. J. Sullivan, J.-R. Ohm, J. Boyce, "Algorithm description of Joint Exploration Test Model 2", WET-B1001, San Diego, March 2016.

All the above-mentioned coding standards support the coding of color video which contains different color components (typically one luma and two chroma components). Each component is an array or single sample from one of the three arrays (e.g., luma and two chroma) that compose a picture in 4:2:0, 4:2:2, or 4:4:4 color formats.

In HEVC and other video coding specifications, a video sequence typically includes a series of pictures. Pictures may also be referred to as "frames." In one example approach, a picture may include three components. Each of the components comprises a sample array, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chroma samples. $S_{Cr}$ is a two-dimensional array of Cr chroma samples. Other types of chroma samples may be used instead of Cb and Cr, such as Cg/Co. In this disclosure, the terms "sample" and "pixel" are used interchangeably.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

In some examples, video encoder 20 partitions a coding block of a CU into two or more prediction blocks. In other examples, a prediction block is the same size as the CU. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive blocks for one or more PUs of a CU, video encoder 20 may generate residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may partition the luma, Cb, and Cr residual blocks of a CU into one or more luma, Cb, and Cr transform blocks. For instance, video encoder 20 may use quadtree partitioning to partition the residual blocks of a CU into transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. As one example, if video encoder 20 transmits certain information, then video decoder 30 may receive such information. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the field of video coding, it is common to apply filtering in order to enhance the quality of a decoded video signal. The filter can be applied as a post-filter, where the filtered frame is not used for prediction of future frames, or as an in-loop filter, where the filtered frame is able to be used to predict future frame. A filter can be designed for example by minimizing the error between the original signal and the decoded filtered signal. Similarly, to transform coefficients the coefficients of the filter $h(k,l)$, $k=-K, \ldots K$, $l=-K, \ldots K$ are quantized $$f(k,l) = \text{round}(\text{normFactor} \cdot h(k,l))$$

coded and sent to the decoder. The normFactor is usually equal to $2^n$. The larger the value of normFactor the more precise is the quantization and the quantized filter coefficients $f(k,l)$ provide better performance. On the other hand, larger values of normFactor produce coefficients $f(k, l)$ requiring more bits to transmit.

In the video decoder, the decoded filter coefficients $f(k, l)$ are applied to the reconstructed image $R(i, j)$ as follows:

$$\tilde{R}(i,j) = \sum_{k=-K}^{K} \sum_{l=-K}^{K} f(k,l) R(i+k, j+l) \Big/ \sum_{k=-k}^{K} \sum_{l=-K}^{K} f(k,l), \quad (1)$$

where i and j are the coordinates of the pixels within the frame.

J. Chen et al, "Coding tools investigation for next generation video coding", SG16-Geneva-C806, January 2015, describes an in-loop adaptive loop filter employed in JEM. The basic idea is similar to the ALF with block-based adaptation that was proposed in HEVC, and was included in various working drafts and test model software, i.e., the HEVC Test Model (or "HM"), although ALF was not included in the final version of HEVC. Among the related technologies, the ALF design in HEVC test model version HM-3.0 was claimed as the most efficient design. (See T. Wiegand, B. Bross, W. J. Han, J. R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011, hereinafter "HEVC Working Draft 3"). Therefore, the ALF design from HM-3.0 is introduced herein.

The ALF in HM-3.0 is based on picture level optimization. That is, the ALF coefficients are derived after a whole frame is coded. The ALF in HM-3.0 has two modes for the luma component: block-based adaptation (BA) and region-based adaptation (RA). These two modes share the same filter shapes, filtering operations as well as syntax elements. The only difference between the two modes is the classification method.

In one example approach, the classification in BA is at a block level. In this example, for the luma component, 4×4 blocks in the whole picture are classified based on one-dimensional (1D) Laplacian direction (up to 3 directions) and two-dimensional (2D) Laplacian activity (up to 5 activity values). In one example approach, each 4×4 block in a picture is assigned a group index based on one-dimensional (1D) Laplacian direction and two-dimensional (2D) Laplacian activity. One example calculation of direction $Dir_b$ and unquantized activity $Act_b$ is shown in equations (2)-(5) below, where $\hat{I}_{i,j}$ indicates a reconstructed pixel with relative coordinate (i,j) to the top-left pixel position of a 4×4 block, $V_{i,j}$ and $H_{i,j}$ are the absolute values of vertical and horizontal gradient of the pixel located at (i,j). As such, direction $Dir_b$ is generated by comparing the absolute values of the vertical gradient and the horizontal gradient in the 4×4 block and $Act_b$ is the sum of the gradients in both directions in the 4×4 block. $Act_b$ is further quantized to the range of 0 to 4, inclusive, as described in HEVC Working Draft 3.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i-1,j} - \hat{I}_{i+1,j}| \quad (3)$$

$$Dir_b = \begin{cases} 1, & \text{if } \left( \sum_{i=0}^{3} \sum_{j=0}^{3} H_{i,j} > 2 \times \sum_{i=0}^{3} \sum_{j=0}^{3} V_{i,j} \right) \\ 2, & \text{if } \left( \sum_{i=0}^{3} \sum_{j=0}^{3} V_{i,j} > 2 \times \sum_{i=0}^{3} \sum_{j=0}^{3} H_{i,j} \right) \\ 0, & \text{otherwise} \end{cases} \quad (4)$$

$$Act_b = \sum_{i=0}^{3} \sum_{j=0}^{3} \left( \sum_{m=i-1}^{i+1} \sum_{n=j-1}^{j+1} (V_{m,n} + H_{m,n}) \right) \quad (5)$$

In one example approach, therefore, each block can be categorized into one out of fifteen (5×3) groups. An index is assigned to each 4×4 block according to the value of $Dir_b$ and $Act_b$ of the block. Denote the group index by C and set C equal to $5Dir_b+\hat{A}$ where $\hat{A}$ is the quantized value of $Act_b$. Therefore, up to fifteen sets of ALF parameters can be signaled for the luma component of a picture. To save the signaling cost, the groups may be merged along group index value. For each merged group, video encoder 20 signals a set of ALF coefficients. Up to three circular symmetric shapes (as shown in FIGS. 3A-3C) are supported.

Figure 2A:
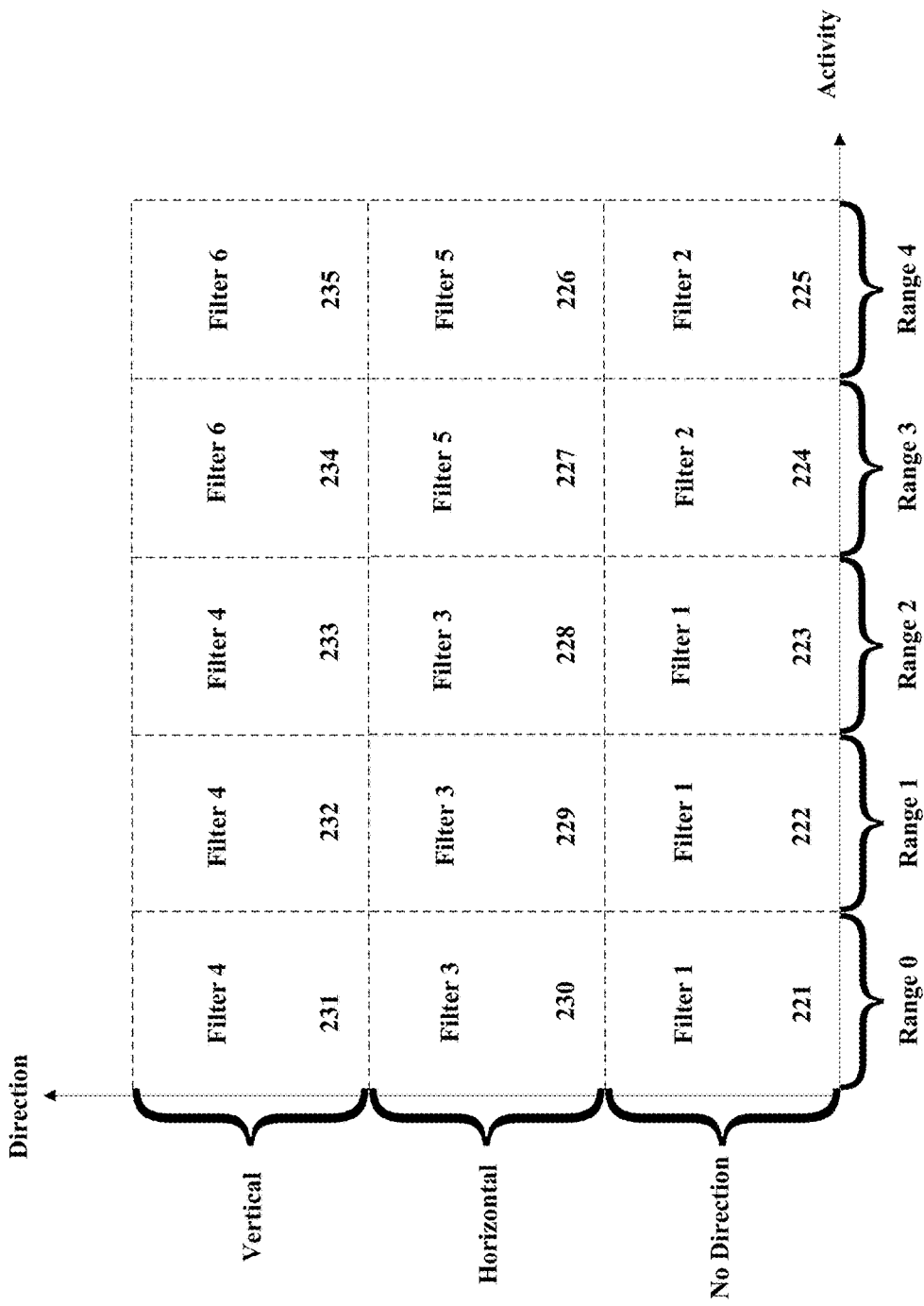
FIG. 2A is a conceptual diagram illustrating a mapping of ranges for an activity metric and a direction metric to filters.
Figure 2B:
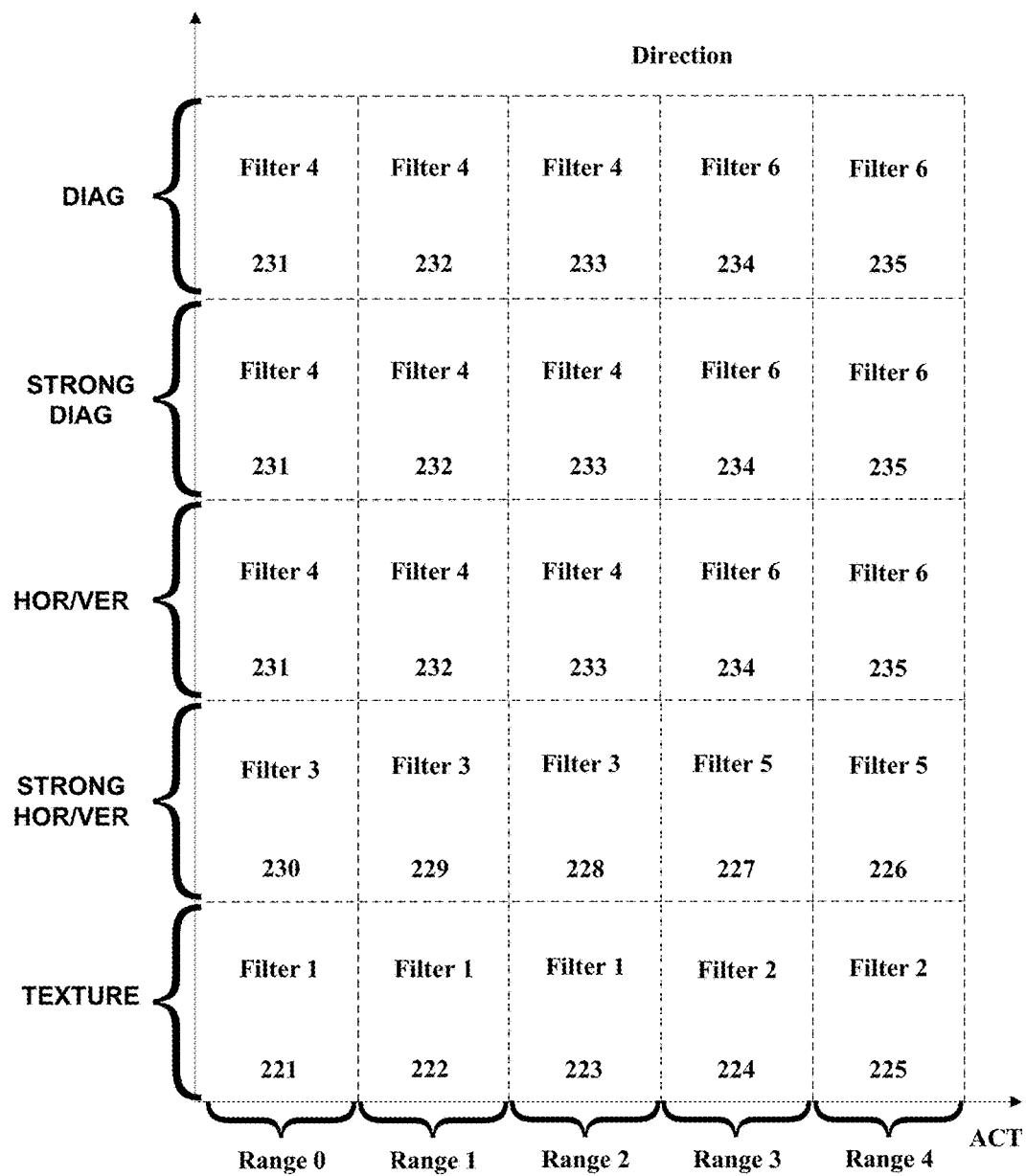
FIG. 2B is a conceptual diagram illustrating a mapping of ranges for an activity metric and a direction metric to filters.

FIG. 2A is a conceptual diagram illustrating these 15 groups used for BA classification. In the example of FIG. 2A, filters are mapped to ranges of values for an activity metric (i.e., Range 0 to Range 4) and a direction metric. The direction metric in FIG. 2A is shown as having values of No Direction, Horizontal, and Vertical, which may correspond to the values of 0, 1, and 2 above from equation 3. The particular example of FIG. 2A shows six different filters (i.e. Filter 1, Filter 2 . . . Filter 6) as being mapped to the 15 categories, but more or fewer filters may similarly be used. Although FIG. 2A shows an example, with 15 groups, identified as groups 221 through 235, more or fewer groups may also be used. For example, instead of five ranges for the activity metric more or fewer ranges may be used resulting in more groups. Additionally, instead of only three directions, additional directions (e.g. a 45-degree direction and 135-degree direction) may also be used, as shown in the example of FIG. 2B.

As will be explained in greater detail below, the filters associated with each group may be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g. one of a horizontal or vertical neighbor), and if that flag is false, a second flag may be sent to indicate if the group is mapped to a second neighboring block (e.g. the other of the horizontal neighbor or the vertical neighbor).

Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

In one example approach, up to three circular symmetric filter shapes are supported. In one such example approach, the three filter shapes are the ones shown in FIGS. 3A-3C. In the examples shown, FIG. 3A illustrates a 5×5 diamond, FIG. 3B illustrates a 7×7 diamond, and FIG. 3C illustrates a truncated 9×9 diamond. The examples in FIGS. 3A-3C are diamond shapes, however other shapes may be used. In most common cases, regardless of the shape of the filter, the center pixel in the filter mask is the pixel that is being filtered. In other examples, the filtered pixel may be offset from the center of the filter mask.

In one example approach, a single set of ALF coefficients is applied to each of the chroma components in a picture. In one such approach, the 5×5 diamond shape filter is always used.

At the decoder side, each pixel sample $\hat{I}_{i,j}$ may be filtered to $I'_{i,j}$ based on the calculations as shown in equation (6) below, where L denotes filter length, $f_{m,n}$ represents filter coefficient, and o indicates filter offset or DC coefficient.

$$I'_{i,j} = \Sigma_{m=-L}^{L} \Sigma_{n=-L}^{L} f_{m,n} \times \hat{I}_{i+m,j+n} + o \quad (6)$$

Note that in one example approach, only one filter is supported for two chroma components.

Coding performance may be improved by utilizing the cross component correlation existing even in YUV 4:2:0 video sequences. To reduce the cross component redundancy, in cross-component linear model (CCLM) prediction mode, the chroma samples are predicted based on the reconstructed luma samples of the same block by using a linear model as follows:

$$\text{pred}_C(i,j) = \alpha \cdot \text{rec}_L(i,j) + \beta \quad (7)$$

where $\text{pred}_C(i,j)$ represents the prediction of chroma samples in a block and $\text{rec}_L(i,j)$ represents the downsampled reconstructed luma samples of the same block. Parameters $\alpha$ and $\beta$ are derived by minimizing regression error between the neighbouring reconstructed luma and chroma samples around the current block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (8)$$

$$\beta = \frac{\Sigma C(n) - \alpha \cdot \Sigma L(n)}{N} \quad (9)$$

where L(n) represents the down-sampled top and left neighboring reconstructed luma samples, C(n) represents the top and left neighboring reconstructed chroma samples, and value of N is equal to twice of the minimum of width and height of the current chroma coding block. For a coding block with square shape, the above two equations (8) and (9) are applied directly. For a non-square coding block, the neighboring samples of the longer boundary are first subsampled to have the same number of samples as the shorter boundary.

In JEM, CCLM prediction mode is extended to the prediction between two chroma components (e.g., a Cr component is predicted from a Cb component). Instead of using the reconstructed sample signal, the CCLM Cb-to-Cr prediction is applied in residual domain. This is implemented by adding a weighted reconstructed Cb residual to the original Cr intra prediction to form the final Cr prediction:

$$\text{pred}_{Cr}^*(i,j) = \text{pred}_{Cr}(i,j) + \alpha \cdot \text{resi}_{Cb}'(i,j) \quad (10)$$

The scaling factor $\alpha$ is derived in a similar way as in CCLM luma-to-chroma mode. The only difference is an addition of a regression cost relative to a default $\alpha$ value in the error function so that derived scaling factor is biased towards the default value (−0.5) as follows:

$$\alpha = \frac{N \cdot \Sigma(Cb(n) \cdot Cr(n)) - \Sigma Cb(n) \cdot \Sigma Cr(n) + \lambda \cdot (-0.5)}{N \cdot \Sigma(Cb(n) \cdot Cb(n)) - \Sigma Cb(n) \cdot \Sigma Cb(n) + \lambda} \quad (11)$$

where Cb(n) represents the neighboring reconstructed Cb samples and Cr(n) represents the neighboring reconstructed Cr samples, and $\lambda$ is equal to $\Sigma(Cb(n) \cdot Cb(n)) \gg 9$.

In JEM, a CCLM luma-to-chroma prediction mode is added as one additional chroma intra prediction mode. At video encoder 20, one more rate/distortion cost check for chroma components is added for selecting the optimal chroma intra prediction mode. When the intra prediction modes other than CCLM luma-to-chroma prediction mode is used for chroma components of a CU, CCLM Cb-to-Cr prediction is used to enhance the Cr component prediction.

In a current design of JEM, the linear model (LM) prediction mode does not fully utilize the correlation between the luma and chroma components because the residual of current chroma pixels are not considered. For instance, in equations (8) and (9), above, L(n) represents the down-sampled top and left neighboring reconstructed luma samples, and C(n) represents the top and left neighboring reconstructed chroma samples. Note that L(n) and C(n) do not include the value of the current chroma sample. Thus, $\alpha$ and $\beta$ are not based on the value of the current chroma sample. L(n) and C(n) do not include the value of the current chroma sample because L(n) and C(n) are used to derive $\alpha$ and $\beta$ for use in CCLM. CCLM is performed as part of predicting the value of the current chroma sample. Thus, the value of the current chroma sample is unavailable for use in deriving $\alpha$ and $\beta$.

The following techniques may improve video data compression performance relative to the existing CCLM techniques because the techniques of this disclosure are able to take advantage of the correlation between components of a picture, such as luma and chroma components of a picture. The techniques of this disclosure may be applied individually, or alternatively, any combination of the techniques may be applied. The following techniques may be applied by a video coding device, such as a device that includes either video encoder 20 or video decoder 30 (FIG. 1).

This disclosure describes techniques related to a cross-component in-loop filter in a video coding system. Given an initial value for a current pixel of one component, the initial value of the current pixel $P^c$ can be modified to $P'^c$ according to spatial neighboring pixels of the current pixel and at least one corresponding pixels in the at least one other components (i.e., cross-component pixels). Typically, one may assume that the current pixel and its corresponding cross-component pixel(s) $P^{cc}$ in the other component(s) follow a predefined relation, such as an equation. This relation may be linear or non-linear.

In one example, the current pixel and the corresponding cross-component pixels follow a simple linear model: $P'^c = \alpha P^{cc} + \beta$, where the parameters $\alpha$ and $\beta$ may be explicitly transmitted in the bitstream or implicitly derived at both encoder and decoder. Thus, in this example, a video coder may apply a cross-component filter that determines a filtered value of a current sample (i.e., $P'^c$) based on a first parameter (i.e., $\alpha$), a second parameter (i.e., $\beta$) and a cross-component sample (i.e., $P^{cc}$).

In another example, the current pixel and the corresponding cross-component pixels may follow a simple linear model: $P'^c = \Sigma_i \alpha_i p_i^{cc} + \beta$, where the $p_i^{cc}$ are the corresponding cross-component pixels and its neighboring pixels in the other component and i is the pixel index, parameters $\alpha_i$ and $\beta$ can be explicitly transmitted in the bitstream or implicitly derived at both encoder and decoder. Thus, in this example, a video coder may apply a cross-component filter that determines a filtered value of a current sample (i.e., $P'^c$) based on a plurality of first parameters (i.e., $\alpha_0 \ldots \alpha_N$), a second parameter (i.e., $\beta$) and a plurality of cross-component samples (i.e., $P_1^{cc} \ldots P_N^{cc}$) Examples of how to determine the plurality of first parameters and the plurality of cross-component samples are provided elsewhere in this disclosure.

In one example, the current pixel and the corresponding cross-component pixels may follow a simple linear model: $P'^c = \Sigma_i \alpha_i p_i^{cc} + \Sigma_j \gamma_j p_j^n + \beta$, where the $p_i^{cc}$ are the corresponding cross-component pixels and its neighboring pixels in the other components, the $p_i^n$ are the spatial neighboring pixels in the current component and i and j are pixel indexes, parameters $\alpha_i$, $\gamma_i$ and $\beta$ can be explicitly transmitted in the bitstream or implicitly derived at both encoder and decoder. In this example, $\gamma_j$ can be derived in the same way as the parameter $\alpha_i$ by minimizing regression error. A difference between $\gamma_j$ and $\alpha_i$ is that $\gamma_j$ are scale factors for the pixels of the current component and $\alpha_i$ are scale factors for the pixels of the other component. According to another example, the initial value of current pixel $P^c$ may be modified to be a value derived by a weighted sum of $P^c$ and $P'^c$ wherein $P'^c$ may be calculated using one of the example models described above.

Figure 4A:
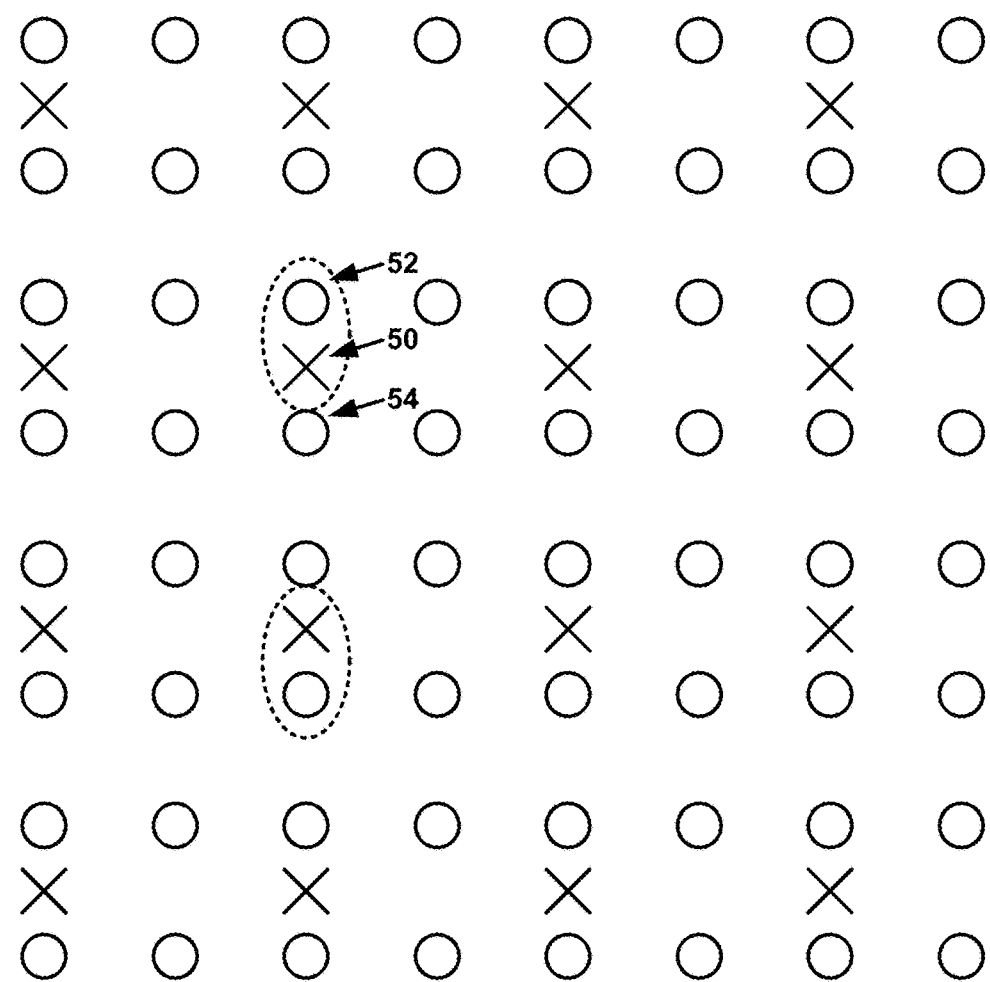
FIG. 4A is a schematic diagram of sampling locations of luma and chroma samples in a picture for the 4:2:0 color format.
Figure 4B:
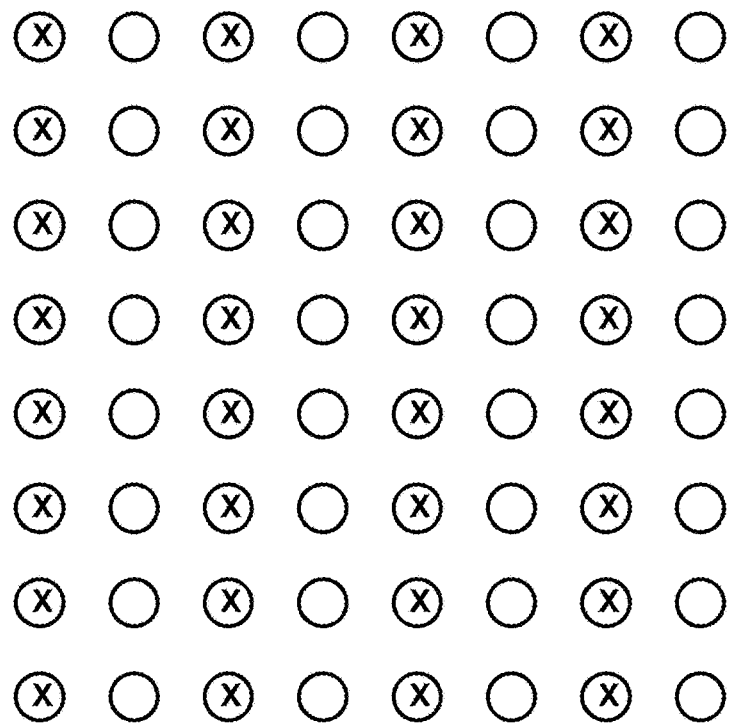
FIG. 4B is a schematic diagram of sampling locations of luma and chroma samples in a picture for the 4:2:2 color format.
Figure 4C:
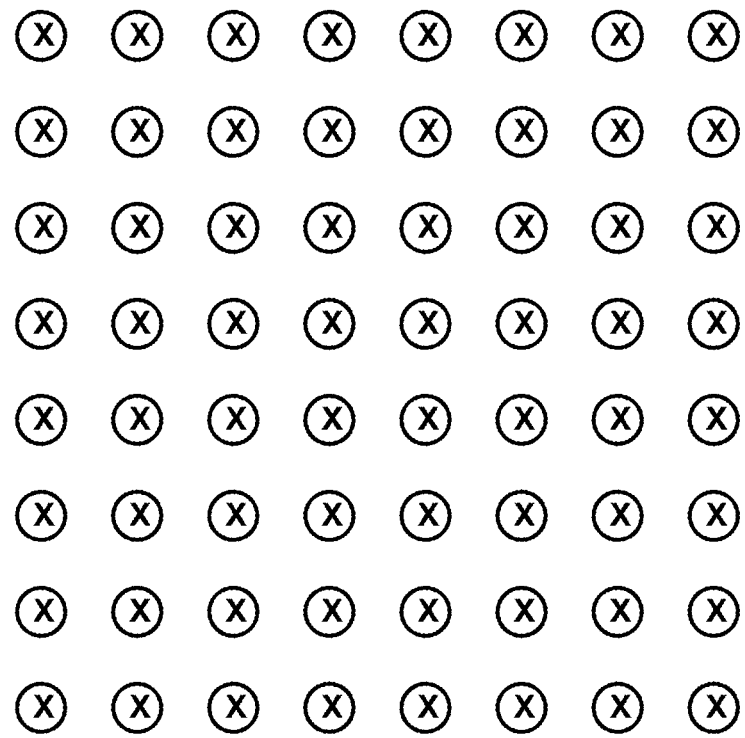
FIG. 4C is a schematic diagram of sampling locations of luma and chroma samples in a picture for the 4:4:4 color format.

FIGS. 4A-4C are schematic diagrams of sampling locations of luma and chroma samples in a picture for 4:2:0, 4:2:2 and 4:4:4 color format, according to an example of the present application. The corresponding pixels in the other components are those pixels at the same sampling position. However, for some color formats, such as 4:2:0, the sampling position of luma and chroma pixels may not be aligned, as shown in FIG. 4A. Therefore, the present disclosure describes different methods to derive the corresponding cross-component pixels. For example, for the 4:4:4 color format, shown in FIG. 4C, several methods of selecting corresponding cross-component pixels may be utilized. In one example, the collocated pixel may be directly selected as the corresponding cross-component pixels. In another example, the collocated pixel along with its neighboring pixels in the other component are first applied a spatial filter for noise reduction (e.g. low-pass filter) and then the filtered one is used as the corresponding cross-component pixel.

For the 4:2:0 color format, shown in FIG. 4A, several methods of selecting corresponding cross-component pixels may be utilized. In one example, the correspondence between luma and chroma samples may be set up as indicated by dotted circles in FIG. 4A. One correspondence is to relate the luma samples located immediately upper to the chroma samples. Another correspondence is to relate the luma samples located immediately bottom to the chroma samples. Thus, in the example of FIG. 4A, a current sample 50 is located between an upper sample 52 and a lower sample 54. As part of applying the cross component filter, a video coder may determine the filtered value of current sample 50 based on $\alpha$, $\beta$, and either the upper luma sample 52 or lower luma sample 54. For instance, the video coder may use upper luma sample 52 or lower luma sample 54 as $P^{cc}$ or $p_i^{cc}$ in the example formulas for applying the cross-component filter described elsewhere in this disclosure.

For the 4:2:2 color format, shown in FIG. 4B, several methods of selecting corresponding cross-component pixels may be utilized. In one example, the collocated pixel may be directly selected as the corresponding cross-component pixels. Thus, in the formulas provided above for calculating the filter values of a current chroma pixel ($P'^c$), the cross-component sample ($P^{cc}$) is equal to the collocated luma pixel.

In another example involving the 4:2:2 color format, a video coder first applies a spatial filter to the collocated pixel along with neighboring pixels of the collocated pixel in the other component. The spatial filter provides noise reduction. For instance, the spatial filter may be a low-pass filter. In this example, the video coder may then use the filtered collocated pixel as the corresponding cross-component pixel. Thus, in the formulas provided above for calculating the filter values of a current chroma pixel ($P'^c$), the video coder may use the filtered collocated pixel as the cross-component sample ($P^{cc}$).

Figure 5A:
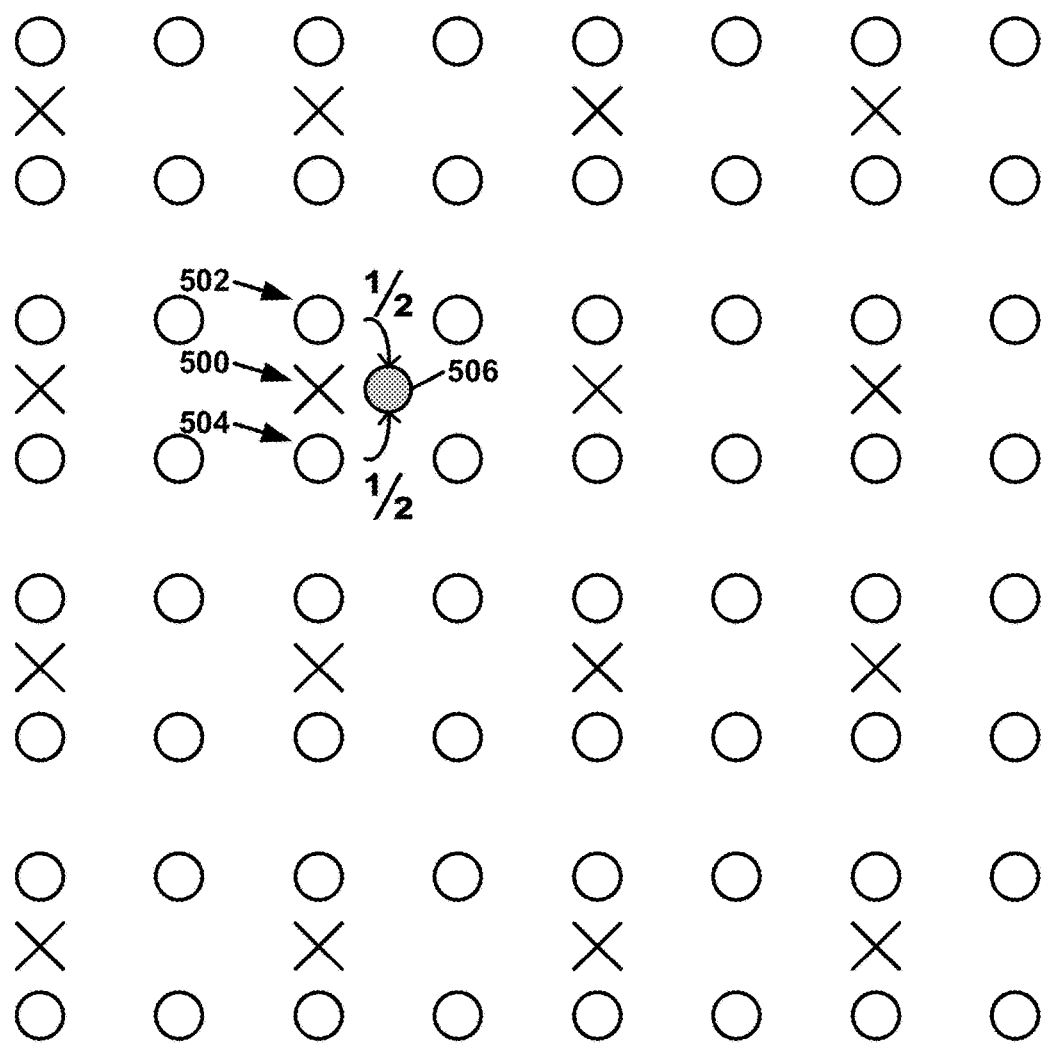
FIG. 5A is a schematic diagram of generation of corresponding cross-component pixels according to examples of this disclosure.
Figure 5B:
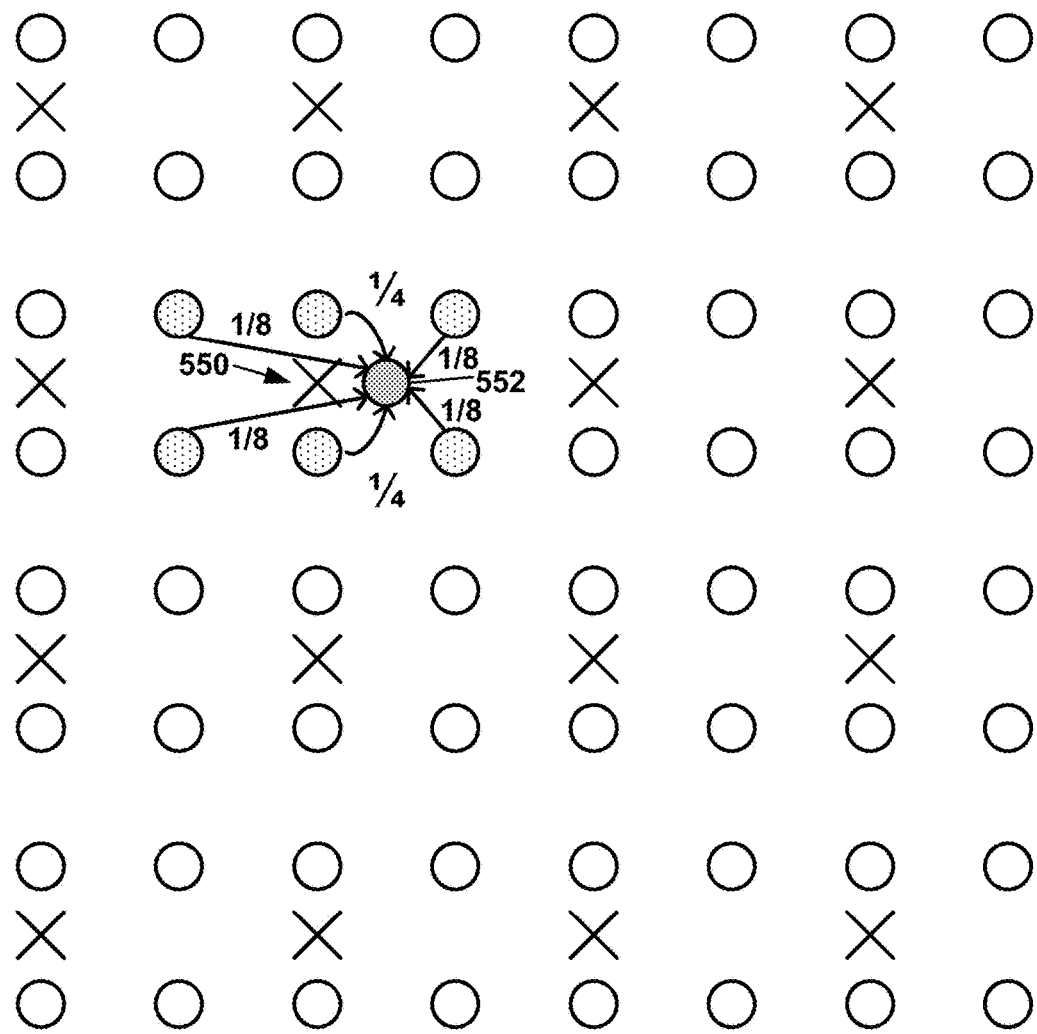
FIG. 5B is a schematic diagram of generation of corresponding cross-component pixels according to examples of this disclosure.

FIGS. 5A and 5B are schematic diagrams of generation of correspondent cross-component pixels for 4:2:0 color format (FIG. 5A), use of upper and bottom luma pixels (FIG. 5B), and use of six surrounding luma pixels. In one example of selecting corresponding cross-component pixels for 4:2:0 color format, the luma pixels located immediately at the upper and bottom of the current chroma pixel may be used to generate a virtual luma pixel using a predefined weighting factors (e.g. ½ and ½) as shown in FIG. 5A. Thus, in the example of FIG. 5A, a current sample 500 is a chroma sample at a position between an upper luma sample 502 above the chroma sample and a lower luma sample 504 below the chroma sample. Upper luma sample 502 and lower luma sample 504 are luma samples. A video coding device may use a weighted average of upper luma sample 502 and lower luma sample 504 to determine a virtual luma sample 506. In this example, as part of applying the cross-component filter, the video coding device determines a filtered value of the current sample based on $\alpha$, $\beta$, and virtual luma sample 506. For instance, the video coding device may use virtual sample 506 as $P^{cc}$ or $p_i^{cc}$ in the example formulas for applying the cross-component filter described elsewhere in this disclosure.

In another example, the six luma pixels surrounding the current chroma pixel may be used to generate a virtual luma pixel using a predefined weighting factors as shown in FIG. 5B. Thus, in the example of FIG. 5B, a video coding device may use a weighted average of six luma samples (shown speckled in FIG. 5B) to determine a virtual luma sample 552. In this example, the video coding device may determine a filtered value of a current sample 550 based on $\alpha$, $\beta$, and virtual luma sample 552. For instance, the video coding device may use virtual luma sample 552 as $P^{cc}$ or $p_i^{cc}$ in the example formulas for applying the cross-component filter described elsewhere in this disclosure. Note that the surrounding pixels and the associated weighting factors are not limited to the example as shown in FIG. 5B.

As described above, the initial pixel value of current pixel $P^c$ may be modified to $P'^c$ according to the predefined linear or non-linear relation between the current pixel and its spatial neighboring pixels and at least one corresponding pixels in the at least one other components. Parameters, such as α and β, used in such relations may be derived in various ways. In one example, to derive the parameters utilized in the predefined linear or non-linear relation formula, the parameters may be calculated through the minimization of the mean square error between the current pixel plus its neighboring pixels and their corresponding cross-component pixels given a predefined relation between them. For example, assume the linear model: $P'^c=\alpha P^{cc}+\beta$. In this example, α and β can be derived using the equation (8) and (9) as described above, where $P'^c$ is a current chroma pixel in a current chroma component (e.g., a Cb or Cr component) and $P^{cc}$ is a corresponding cross-component luma pixel. Equations (8) and (9) are reproduced again below:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \qquad (8)$$

$$\beta = \frac{\Sigma C(n) - \alpha \cdot \Sigma L(n)}{N} \qquad (9)$$

In equations (8) and (9), L(n) denotes a cross-component luma sample for pixel index n located within a predefined local area, C(n) represents the current chroma pixel and its spatially neighboring pixels within a predefined local area, and value of N is equal to number of pixels in this local area. Note that in CCLM, the values C(n) do not include the current chroma pixel, but when determining α and β for the cross-component filter of this disclosure, C(n) does include the current chroma pixel and, accordingly, L(n) includes a cross-component luma sample corresponding to the current chroma pixel.

Figure 6:
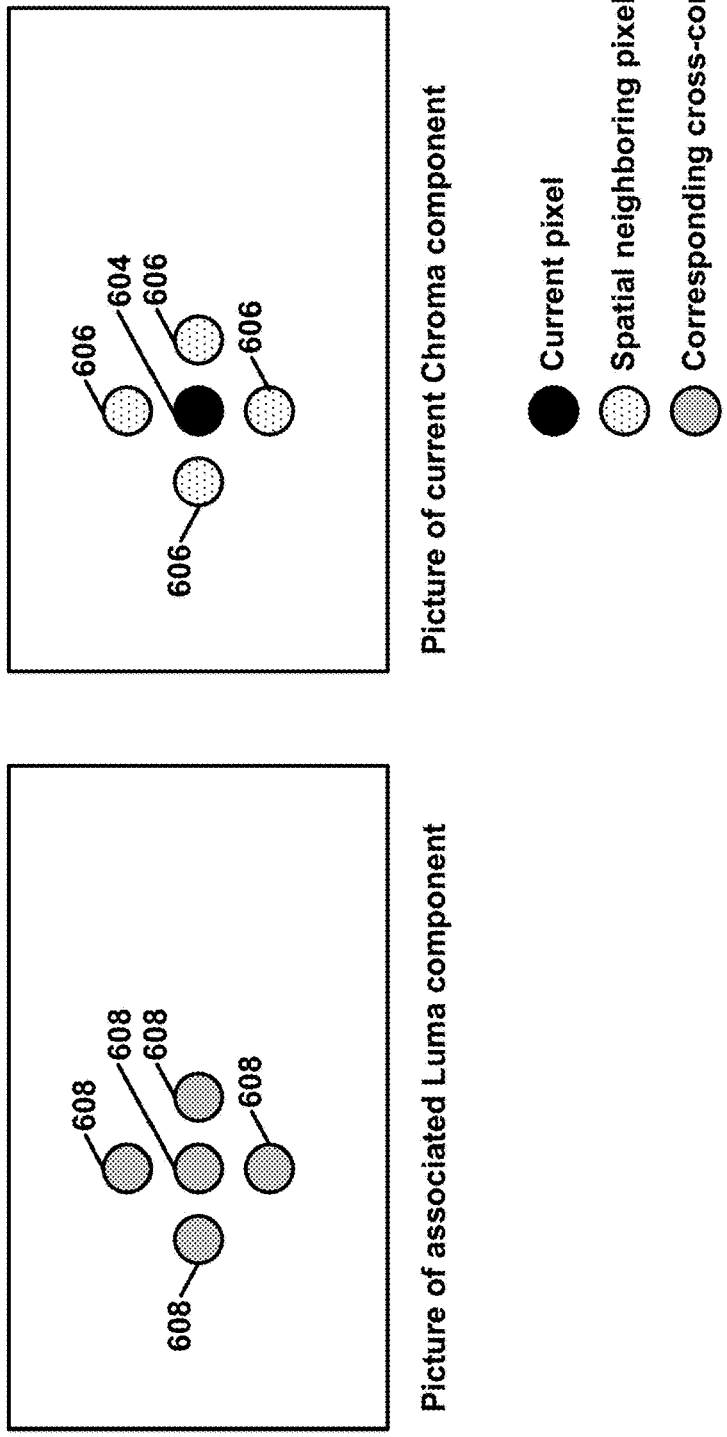
FIG. 6 is a schematic diagram of an example of the local area to derive parameters utilized in a predefined linear or non-linear relation formula, in accordance with an aspect of this disclosure.
Figure 7:
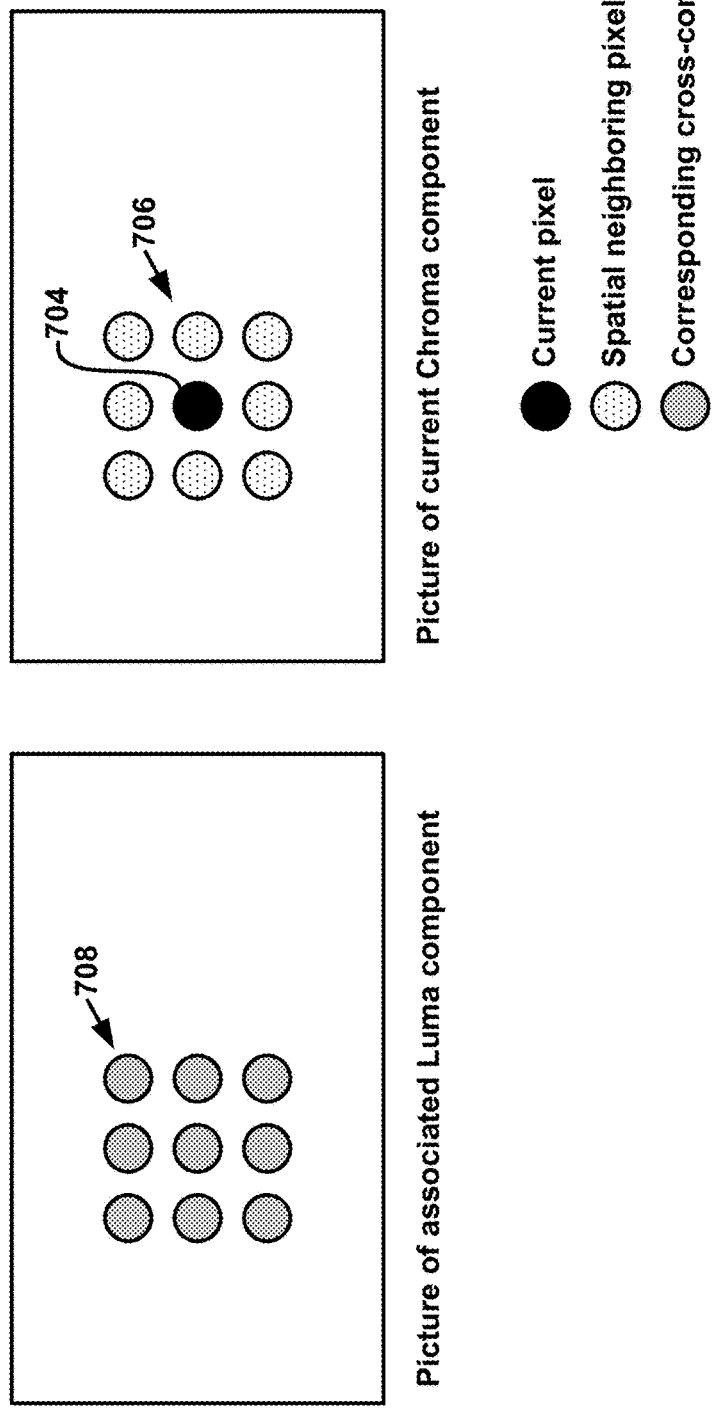
FIG. 7 is a schematic diagram of an example of the local area to derive parameters utilized in a predefined linear or non-linear relation formula, in accordance with an aspect of this disclosure.

FIGS. 6 and 7 are schematic diagrams of examples of local areas to derive parameters utilized in a predefined linear or non-linear relation formula, according to an example of the present disclosure. As shown in FIGS. 6 and 7, two examples of cross pattern (FIG. 6) and 3×3 block pattern (FIG. 7) to form the local area may be used to derive parameters used in a cross-component filter, respectively. Thus, in the example of FIG. 6, C(n) includes current pixel 604 and spatial neighboring pixels 606. Furthermore, in the example of FIG. 6, L(n) includes each of cross-component pixels 608. Similarly, in the example of FIG. 7, C(n) includes current pixel 704 and spatial neighboring pixels 706. Furthermore, in the example of FIG. 7, L(n) includes each of cross-component pixels 708.

In one example, the parameter is derived by a Gaussian filter or an edge-preserved filter (e.g. extending the concept of bilateral filter, such as described at https://en.wikipedia.org/wiki/Bilateral_filter, for example, to incorporating the cross-component pixels). For example, assume the linear model: $P'^c=\alpha P^{cc}+\beta$. In this example, α and β can be derived using the following equations:

$$\alpha = \omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \qquad (12)$$

$$\beta = 0 \qquad (13)$$

In the equations above, the weight ω(i,j,k,l) is the weight assigned for reference sample (k, l) to filter the sample (i, j). I(i, j) and I(k, l) are the sample value of samples (i, j) and (k,l) respectively. $\sigma_d$ is the spatial parameter and $\sigma_r$ is the range parameter for the bilateral filtering.

To give more influence of the relation between a current pixel and its corresponding cross-component pixel when deriving the parameters, more weight may be placed on the current pixel and its corresponding pixel. In other words, in determining the first parameter and the second parameter more weight is placed on the current sample and a corresponding cross-component sample of the plurality of cross-component samples than the plurality of neighbor samples that spatially neighbor the current sample and the plurality of cross-component samples that correspond to the neighbor samples. For example, equations (8) and (9) may be rewritten as equations (8') and (9'):

$$\alpha = \frac{N \cdot \Sigma(w_1 L(n) \cdot w_2(n)C(n)) - \Sigma w_1 L(n) \cdot \Sigma w_2(n)C(n)}{N \cdot \Sigma(w_1(n)L(n) \cdot w_1(n)L(n)) - \Sigma w_1(n)L(n) \cdot \Sigma w_1(n)L(n)} \qquad (8')$$

$$\beta = \frac{\Sigma w_2(n) \cdot C(n) - \alpha \cdot \Sigma w_1(n)L(n)}{N} \qquad (9')$$

In equations (8') and (9'), $w_1(n)$ is a weight assigned to the n-th cross-component pixel of a plurality of cross-component pixels that includes a cross-component pixel collocated with the current pixel. In this example, when calculating α and β for the purpose of applying a cross-component filter for a current pixel, the weight assigned to the cross-component pixel collocated with the current pixel is greater than weights assigned to the other cross-component pixels. $w_2(n)$ is a weight assigned to the n-th pixel of a set of pixels that includes the current pixel and one or more neighboring pixels of the same color component as the current pixel. In this example, when calculating α and β for the purpose of applying a cross-component filter for the current pixel, the weight assigned to the current pixel is greater than weights assigned to the neighboring pixels of the same color component as the current pixel.

The weight for the current pixel may be fixed within a slice, tile, picture, or sequence. For instance, a video coder may use the same weight for the current pixel when applying a cross-component filter to pixels in a slice, all pixels in a tile, all pixels in a picture, or all pixels in a sequence. In one example, the weight for the current pixel is set to 4 and the weight for the cross-component pixel collocated with the current pixel is also set to 4. In some examples, video encoder 20 signals the weight in a slice header, a picture parameter set, a sequence parameter set, a video parameter set, or another type of syntax structure.

In some examples, the weight may be adaptively changed within a specific size. The adaptively selected weight may be signaled. For example, the weights for the current pixel and the cross-component pixel collocated with the current pixel can be set to one of a predefined weighting set (e.g. {1, 4, 8, 12}). In this example, video encoder 20 tries different weights and signals the weight having the best rate-distortion performance into the bitstream. In some examples, the adaptively selected weight is dependent on a coding mode/split structure. For example, the weights for the current pixel and the cross-component pixel collocated with the current pixel are set to 12 when the current pixel belongs to a block coded as inter-prediction mode while the weights are set to 4 when the current pixel belong to a block coded as intra-prediction mode.

In various examples, a video coder (e.g., video encoder 20 and/or video decoder 30) may perform the cross-component filter at different stages of a codec. In a first example, a video coder may perform the cross-component filter in the prediction stage. For instance, in this example, the video coder may perform the cross-component filter as part of applying a motion compensation filter. Thus, in this first example, the video coder may include a filtered value of a current sample in a predictive block (e.g., a predictive block for a PU). In this example, the video coder may reconstruct a block by adding samples of the predictive block to corresponding samples of a residual block. In this example, the video coder may generate a final version of a current picture based on the reconstructed block.

In a second example, the video coder may apply the cross-component filter as an in-loop filter immediately after applying a de-blocking filter. Samples generated using an in-loop filter may be subsequently used for reference (e.g., in intra prediction or inter prediction). In a third example, the video coder applies the cross-component filter as an in-loop filter immediately after applying the SAO filter. In some examples, the cross-component filter and a chroma ALF process share the same on/off flags. For instance, in one example, one or more flags control whether a video coder applies a chroma ALF process. In this example, video encoder 20 may signal the one or more flags as one or more syntax elements in a bitstream. In this example, the same one or more flags control whether the video coder applies the cross-component filter.

In a fourth example, the video coder applies the cross-component filter as an in-loop filter immediately after applying an ALF. In some examples, a video coder determines on/off flags of the cross-component filter by evaluating the reconstruction blocks before and after ALF. For example, a video coder may determine whether to apply the cross-component filter based on a value of an on/off flag. In this example, the video coder first performs the ALF for the luma component, the ALF filtered luma component is then used to apply a cross-component filter for the chroma components. The video coder then compares a rate-distortion of the filtered chroma components and the un-filtered chroma components to decide the value of an on/off flag for the cross-component filter.

In a fifth example, a video coder applies the cross-component filter as an in-loop filter immediately after applying ALF luma filtering and before applying ALF chroma filtering. In a sixth example, a video coder applies the cross-component filter as an in-loop filter at the last position of all in-loop filters.

In a seventh example, a video coder may perform the cross-component filter as a post-filter. Thus, in this seventh example, the filtered values generated by applying the cross-component filter are not used for reference in intra prediction or inter prediction. In the seventh example, video encoder 20 may signal additional control information in the bitstream, such as on/off flags, for the cross-component filter. The control information controls whether video decoder 30 applies the cross-component filter.

For each component, video encoder 20 may signal control syntax in the bitstreams at different levels. For instance, video encoder 20 may signal control syntax for a Cb component and separate control syntax for a Cr component. The control syntax control for a color component whether video decoder 30 applies the cross-component filter to determine filtered values of the color component. Video encoder 20 may signal the control syntax at a sequence level, a picture level, a slice level, a CTU/CTB level, a CU/CB level, a PU/predictive block level, or an M×N block level or the depth of quad tree or the depth of CU/PU.

In one example, video encoder 20 signals one slice-level flag to indicate the enabling of the cross-component filter for a current slice. When this slice-flag is signaled as off, the filter is disabled and no further syntax needs to be signaled below the slice-level. When the slice-level flag is signaled as on, video encoder 20 may also signal lower-level syntax to control the cross-component filter in finer granularity. For example, for each respective CTU/CTB, video encoder 20 may further signal a flag to indicate whether the cross-component filter is enabled for the respective CTU/CTB. In one example, all the controlling syntax below the slice-level may be coded using CABAC.

In some examples, the on/off control for Cb and Cr components may share the same syntax element to save signaling overhead. For example, rather than having a first syntax element to control whether a video coder applies a cross-component filter to determine filtered values of Cb samples and a second syntax element to control whether the video coder applies the cross-component filter to determine filtered values of Cr samples, in this example, a single syntax element control whether the video coder applies the cross-component filter to determine filtered values of Cb and Cr samples.

Figure 8:
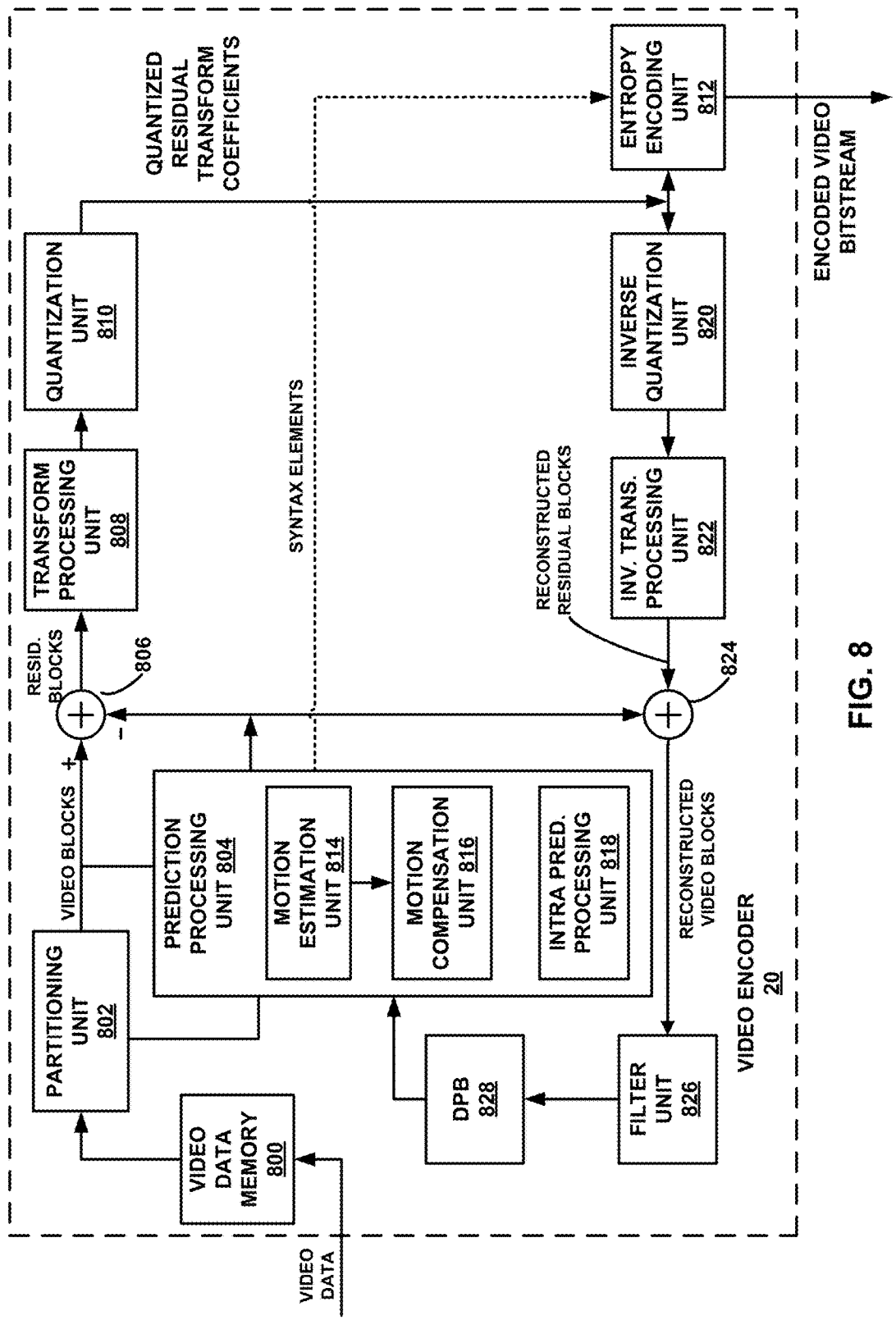
FIG. 8 is a block diagram illustrating an example video encoder configured to implement techniques described in this disclosure.

FIG. 8 is a block diagram illustrating an example video encoder 20 configured to implement techniques described in this disclosure. Video encoder 20 may perform intra- and inter-coding of video blocks within slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes a video data memory 800, partitioning unit 802, prediction processing unit 804, summer 806, transform processing unit 808, quantization unit 810, entropy encoding unit 812. Prediction processing unit 804 includes motion estimation unit 814, motion compensation unit 816, and intra prediction unit 818. For video block reconstruction, video encoder 20 also includes inverse quantization unit 820, inverse transform processing unit 822, summer 824, filter unit 826, and decoded picture buffer (DPB) 828.

As shown in FIG. 8, video encoder 20 receives video data and stores the received video data in video data memory 800. Video data memory 800 may store video data to be encoded by the components of video encoder 20. The video data stored in video data memory 800 may be obtained, for example, from video source 18. DPB 828 may be a reference picture memory that stores reference video data for use in encoding video data by video encoder 20, e.g., in intra- or inter-coding modes. Video data memory 800 and DPB 828 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 800 and DPB 828 may be provided by the same memory device or separate memory devices. In various examples, video data memory 800 may be on-chip with other components of video encoder 20, or off-chip relative to those components.

Partitioning unit 802 retrieves the video data from video data memory 800 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a slice to be encoded. The slice may be divided into multiple video blocks (and possibly into sets of video blocks referred to as tiles). Prediction processing unit 804 may select one of a plurality of possible coding modes, such as one of a plurality of intra coding modes or one of a plurality of inter coding modes, for the current video block based on error results (e.g., coding rate and the level of distortion). Prediction processing unit 804 may provide the resulting intra- or inter-coded block to summer 806 to generate residual block data and to summer 824 to reconstruct the encoded block for use as a reference picture.

Intra prediction unit 818 within prediction processing unit 804 may perform intra-predictive coding of the current video block relative to one or more neighboring blocks in the same frame or slice as the current block to be coded to provide spatial compression. Motion estimation unit 814 and motion compensation unit 816 within prediction processing unit 804 perform inter-predictive coding of the current video block relative to one or more predictive blocks in one or more reference pictures to provide temporal compression.

Motion estimation unit 814 may be configured to determine the inter-prediction mode for a slice according to a predetermined pattern for a video sequence. The predetermined pattern may designate slices in the sequence as P slices or B slices. Motion estimation unit 814 and motion compensation unit 816 may be highly integrated, but are illustrated separately for conceptual purposes. Motion estimation, performed by motion estimation unit 814, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 828. For example, video encoder 20 may interpolate values of one-quarter pixel positions, one-eighth pixel positions, or other fractional pixel positions of the reference picture. Therefore, motion estimation unit 814 may perform a motion search relative to the full pixel positions and fractional pixel positions and output a motion vector with fractional pixel precision.

Motion estimation unit 814 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 828. Motion estimation unit 814 sends the calculated motion vector to entropy encoding unit 812 and motion compensation unit 816.

Motion compensation, performed by motion compensation unit 816, may involve fetching or generating the predictive block based on the motion vector determined by motion estimation, possibly performing interpolations to sub-pixel precision. Upon receiving the motion vector for the PU of the current video block, motion compensation unit 816 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 806 represents the component or components that perform this subtraction operation. Motion compensation unit 816 may also generate syntax elements associated with the video blocks and the slice for use by video decoder 30 in decoding the video blocks of the slice.

After prediction processing unit 804 generates the predictive block for the current video block, either via intra prediction or inter prediction, video encoder 20 forms a residual video block by subtracting the predictive block from the current video block. The residual video data in the residual block may be included in one or more TUs and applied to transform processing unit 808. Transform processing unit 808 transforms the residual video data into residual transform coefficients using a transform, such as a discrete cosine transform (DCT) or a conceptually similar transform. Transform processing unit 808 may convert the residual video data from a pixel domain to a transform domain, such as a frequency domain.

Transform processing unit 808 may send the resulting transform coefficients to quantization unit 810. Quantization unit 810 quantizes the transform coefficients to further reduce bit rate. The quantization process may reduce the bit depth associated with some or all of the coefficients. The degree of quantization may be modified by adjusting a quantization parameter. In some examples, quantization unit 810 may then perform a scan of the matrix including the quantized transform coefficients. Alternatively, entropy encoding unit 812 may perform the scan.

Following quantization, entropy encoding unit 812 entropy encodes the quantized transform coefficients. For example, entropy encoding unit 812 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 812, the encoded bitstream may be transmitted to video decoder 30, or archived for later transmission or retrieval by video decoder 30. Entropy encoding unit 812 may also entropy encode the motion vectors and the other syntax elements for the current slice being coded.

Inverse quantization unit 820 and inverse transform processing unit 822 apply inverse quantization and inverse transformation, respectively, to reconstruct the residual block in the pixel domain for later use as a reference block of a reference picture. Motion compensation unit 816 may calculate a reference block by adding the residual block to a predictive block of one of the reference pictures within one of the reference picture lists. Motion compensation unit 816 may also apply one or more interpolation filters to the reconstructed residual block to calculate sub-integer pixel values for use in motion estimation. Summer 824 adds the reconstructed residual block to the motion compensated prediction block produced by motion compensation unit 816 to produce a reconstructed block.

Filter unit 826 filters the reconstructed block (e.g. the output of summer 824) and stores the filtered reconstructed block in DPB 828 for uses as a reference block. The reference block may be used by motion estimation unit 814 and motion compensation unit 816 as a reference block to inter-predict a block in a subsequent video frame or picture.

Filter unit 826 represents one or more filters that may be performed on a reconstructed block. Examples of the types of filtering that may be performed by filter unit 826 include, deblock filtering, ALF, filtering, SAO filtering, cross-component filtering, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used. The various filters applied by filter unit 826 may be applied in a variety of different orders.

In some examples, filter unit 826 applies the cross-component filter described elsewhere in this disclosure. In some examples where filter unit 826 applies the cross-component filter, filter unit 826 may apply one or more other types of filters before or after applying the cross-component filter. For instance, in some examples, filter unit 826 applies the cross-component filter after applying an ALF. In some examples where the cross-component filter is performed in the prediction stage, motion compensation unit 826 applies the in-loop cross-component filter.

Figure 9:
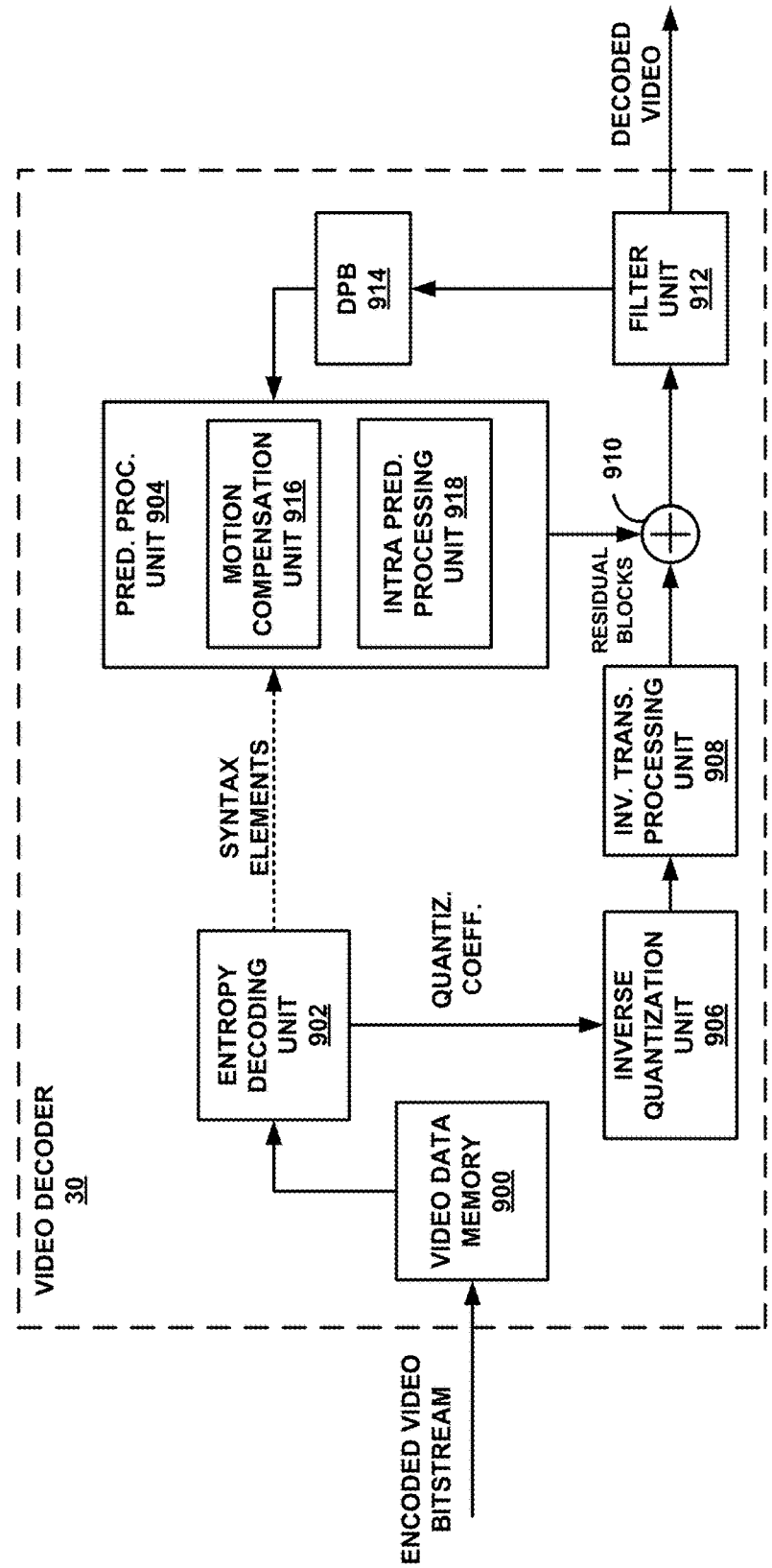
FIG. 9 is a block diagram illustrating an example video decoder configured to implement techniques described in this disclosure.

FIG. 9 is a block diagram illustrating an example video decoder 30 configured to implement the techniques described in this disclosure. In some examples, video decoder 30 of FIG. 9 is configured to receive a bitstream generated by video encoder 20 of FIG. 8. In the example of FIG. 9, video decoder 30 includes video data memory 900, entropy decoding unit 902, prediction processing unit 904, inverse quantization unit 906, inverse transform processing unit 908, summer 910, filter unit 912, and DPB 914. Prediction processing unit 904 includes motion compensation unit 916 and intra prediction unit 918. In some examples, video decoder 30 performs a decoding pass generally reciprocal to the encoding pass described with respect to video encoder 20 from FIG. 8.

During the decoding process, video decoder 30 receives an encoded video bitstream that represents video blocks of an encoded slice and associated syntax elements from video encoder 20. Video decoder 30 stores the received encoded video bitstream in video data memory 900. Video data memory 900 may store video data, such as an encoded video bitstream, to be decoded by the components of video decoder 30. The video data stored in video data memory 900 may be obtained, for example, via link 16 (FIG. 1), from storage device 26 (FIG. 1), or from a local video source, such as a camera, or by accessing physical data storage media. Video data memory 900 may form a coded picture buffer (CPB) that stores encoded video data from an encoded video bitstream. DPB 914 may be a reference picture memory that stores reference video data for use in decoding video data by video decoder 30, e.g., in intra- or inter-coding modes. Video data memory 900 and DPB 914 may be formed by any of a variety of memory devices, such as DRAM, SDRAM, MRAM, RRAM, or other types of memory devices. Video data memory 900 and DPB 914 may be provided by the same memory device or separate memory devices. In various examples, video data memory 900 may be on-chip with other components of video decoder 30, or off-chip relative to those components.

Entropy decoding unit 902 entropy decodes video data stored in video data memory 900 to generate quantized coefficients, motion vectors, and other syntax elements. For example, entropy decoding unit 902 may perform CABAC decoding, or another type of entropy decoding. Entropy decoding unit 902 may forward particular syntax elements to prediction processing unit 904.

When a slice is coded as an intra-coded (I) slice, intra prediction unit 918 of prediction processing unit 904 may generate prediction data for a video block of the current slice based on a signaled intra prediction mode and data from previously decoded blocks of the current frame or picture. When the video frame is coded as an inter-coded slice (e.g., B slice or P slice), motion compensation unit 916 of prediction processing unit 904 produces predictive blocks for a video block of the current slice based on the motion vectors and other syntax elements received from entropy decoding unit 902. The predictive blocks may be produced from one of the reference pictures within one of the reference picture lists. Video decoder 30 may construct the reference frame lists, List 0 and List 1, using default construction techniques based on reference pictures stored in DPB 914.

Motion compensation unit 916 determines prediction information for a video block of the current slice by parsing the motion vectors and other syntax elements, and uses the prediction information to produce the predictive blocks for the current video block being decoded. For example, motion compensation unit 916 uses some of the received syntax elements to determine a prediction mode (e.g., intra- or inter-prediction) used to code the video blocks of the slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current slice.

Motion compensation unit 916 may also perform interpolation based on interpolation filters. Motion compensation unit 916 may use interpolation filters as used by video encoder 20 during encoding of the video blocks to calculate interpolated values for sub-integer pixels of reference blocks. In this case, motion compensation unit 916 may determine the interpolation filters used by video encoder 20 from the received syntax elements and use the interpolation filters to produce predictive blocks.

Inverse quantization unit 906 inverse quantizes, i.e., de-quantizes, the quantized transform coefficients provided in the bitstream and decoded by entropy decoding unit 902. The inverse quantization process may include use of a quantization parameter calculated by video encoder 20 for each video block in the slice to determine a degree of quantization and, likewise, a degree of inverse quantization that should be applied. Inverse transform processing unit 908 applies an inverse transform, e.g., an inverse DCT, an inverse integer transform, or a conceptually similar inverse transform process, to the transform coefficients in order to produce residual blocks in the pixel domain.

After prediction processing unit 904 generates the predictive block for the current video block using, for example, intra or inter prediction, video decoder 30 forms a reconstructed video block by summing the residual blocks from inverse transform processing unit 908 with the corresponding predictive blocks generated by motion compensation unit 916. Summer 910 represents the component or components that perform this summation operation.

Filter unit 912 filters the reconstructed video block using, for example, one or more filters described in this disclosure. Filter unit 912 represents one or more filters that may be performed on a reconstructed block. Examples of the types of filtering that may be performed by filter unit 912 include, deblock filtering, ALF, filtering, SAO filtering, cross-component filtering, or other types of loop filters. A deblocking filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used. The various filters applied by filter unit 912 may be applied in a variety of different orders.

Other in-loop filters (either in the coding loop or after the coding loop) may also be used to smooth pixel transitions or otherwise improve the video quality. The decoded video blocks in a given frame or picture are then stored in DPB 914, which stores reference pictures used for subsequent motion compensation. DPB 914 may be part of or separate from additional memory that stores decoded video for later presentation on a display device, such as display device 32 of FIG. 1.

Filter unit 912 in conjunction with other components of video decoder 30 may be configured to perform the various techniques described in this disclosure. For instance, in some examples, filter unit 912 applies the cross-component filter described elsewhere in this disclosure. In some examples where filter unit 912 applies the cross-component filter, filter unit 912 may apply one or more other types of filters before or after applying the cross-component filter. For instance, in some examples, filter unit 912 applies the cross-component filter after applying an ALF. In some examples where the cross-component filter is performed in the prediction stage, motion compensation unit 912 applies the in-loop cross-component filter.

Figure 10:
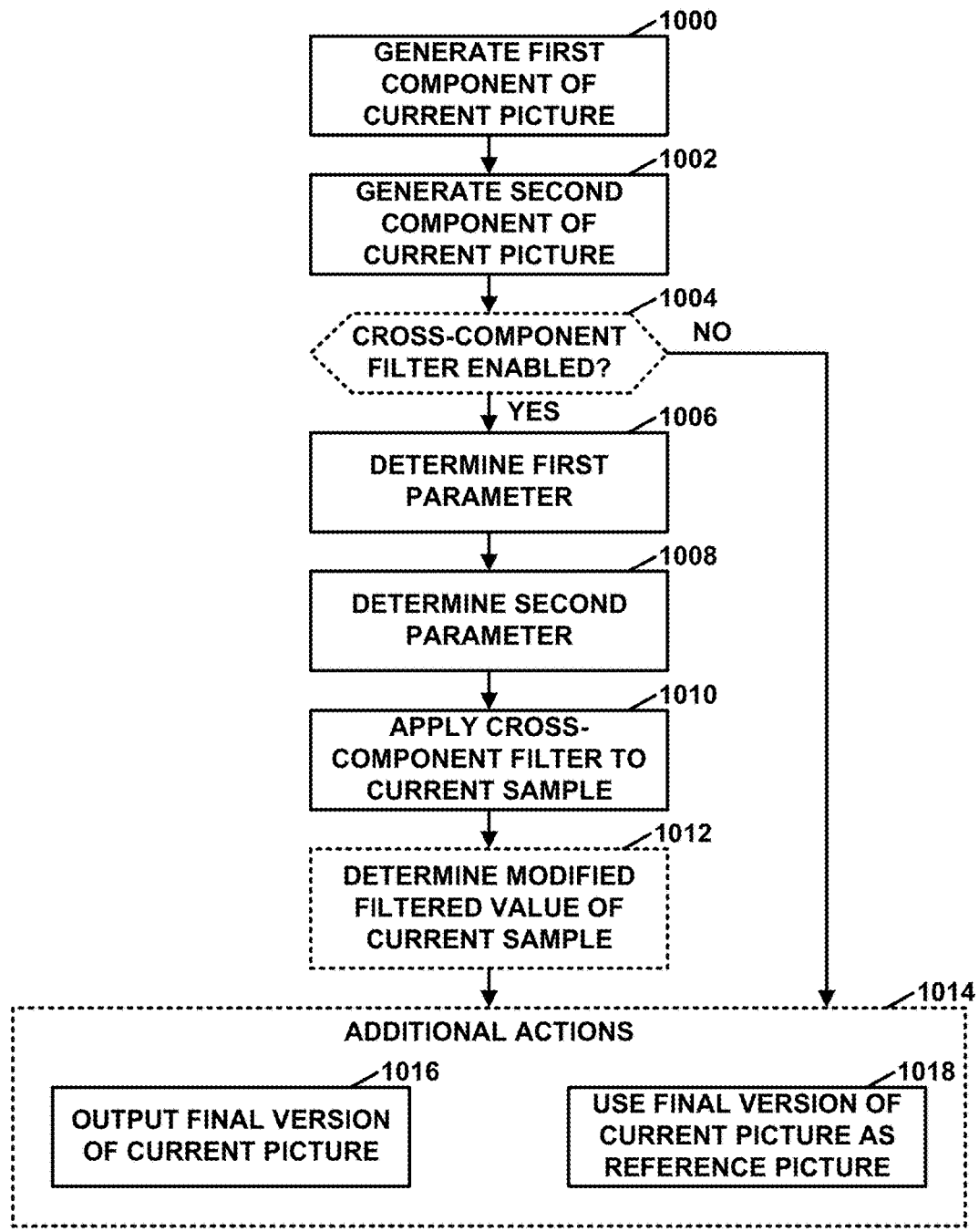
FIG. 10 is a flowchart illustrating an example operation of a video coding device, in accordance with techniques of this disclosure.

FIG. 10 is a flowchart illustrating an example operation of a video coder, in accordance with techniques of this disclosure. Unless specified, the actions of the operation of FIG. 10 may be performed by either video encoder 20 or video decoder 30. In other examples, actions of FIG. 10 may be performed in different orders or in parallel. Other operations may include more, fewer, or different actions.

In the example of FIG. 10, the video coder generates a first component of a current picture of the video data (1000). The first component comprises a first array of samples. For example, each sample of the first component may be a luma sample, each sample of the first component may be a Cb sample, or each sample of the first component may be a Cr sample.

Additionally, the video coder generates a second component of the current picture (1002). The second component comprises a second array of samples separate from the first array of samples. For example, if samples of the first component are Cb or Cr samples, samples of the second component may be luma samples. Thus, in one example, the first array of samples consists of a first type of chroma samples and either: the second array of samples consists of luma samples or the second array of samples consists of a second array of chroma samples.

In some examples where the video coder is a video decoder, the video coder may determine whether the cross-component filter is enabled for the first component (1004). The video decoder may determine whether the cross-component filter is enabled in various ways. For example, the video decoder may obtain, from a bitstream that comprises an encoded representation of the current picture, a syntax element indicating whether the cross-component filter is enabled for the first component. Thus, in this example, a video encoder (e.g., video encoder 20) may signal, in a bitstream that comprises an encoded representation of the current picture, a syntax element indicating whether the cross-component filter is enabled for the first component of the current picture.

Furthermore, in the example of FIG. 10, when the cross-component filter is enabled ("YES" branch of 1004), the video coder determines a first parameter (e.g., a) (1006). In accordance with techniques of this disclosure, the first parameter is based on a value of a current sample in the first component of the current picture. In some examples, the video coder implicitly determines the first parameter. For example, the video coder may determine the first parameter in accordance with equation (8), where L(n) includes a cross-component sample corresponding to the current sample and C(n) includes the current sample. In some examples where the video coder is a video decoder, the video decoder determines the first parameter by obtaining from a bitstream a syntax element specifying a value of the first parameter. In other words, the video decoder may determine the first parameter based on a first syntax element signaled in a bitstream that comprises an encoded representation of the current picture. In such examples where the video coder is a video encoder, the video encoder may signal the syntax element in the bitstream.

The video coder also determines a second parameter (e.g., β) (1008). The second parameter is based on the value of the current sample. In some examples, the video coder implicitly determines the second parameter. For example, the video coder may determine the first parameter in accordance with equation (9), where L(n) includes a cross-component sample corresponding to the current sample and C(n) includes the current sample. In some examples where the video coder is a video decoder, the video decoder determines the second parameter by obtaining from a bitstream a syntax element specifying a value of the second parameter. In other words, the video decoder may determine the first parameter based on a first syntax element signaled in a bitstream that comprises an encoded representation of the current picture. In such examples, video encoder 20 may signal the syntax element in the bitstream.

In instances where the video coder does not merely obtain values of the first and second parameters from syntax elements in a bitstream, the video coder may determine the first and second parameters in various ways. For instance, in one example consistent with FIG. 6 and FIG. 7 as described above, the first component comprises a current set of samples. In this example, the current set of samples includes the current sample and a plurality of neighbor samples that spatially neighbor the current sample in the first component (e.g., samples 606 (FIG. 6) or samples 706 (FIG. 7)). In this example, the one or more cross-component samples include a plurality of cross-component samples. For instance, the one or more cross-component samples may include samples 608 (FIG. 6) or samples 708 (FIG. 7). For each respective neighbor sample in the plurality of neighbor samples, the plurality of cross-component samples includes a sample in the second component corresponding to the respective neighbor sample, the plurality of cross-component samples further includes a sample in the second component corresponding to the current sample. In this example, the first parameter is determined through minimization of a mean square error between the current set of samples and the plurality of cross-component samples given a first predefined relation (e.g., $P'^c=\alpha P^{cc}+\beta$) between the current set of samples and the plurality of cross-component samples. Likewise, the second parameter is determined through minimization of a mean square error between the current set of samples and the plurality of cross-component samples given the predefined relation (e.g., $P'^c=\alpha P^{cc}+\beta$) between the current set of samples and the plurality of cross-component samples.

In other examples, the video coder determines the first parameter by using a Gaussian filter or an edge-preserved filter. For instance, the video coder may derive the first parameter like a Bilateral parameter as shown in the equation (12). In some examples, the video coder determines the second parameter by using the Gaussian filter or the edge-preserved filter or simply set to zero.

Furthermore, in the example of FIG. 10, the video coder applies a cross-component filter to the current sample, thereby determining a filtered value of the current sample (1010). The cross-component filter is based on the first parameter, the second parameter, and one or more cross-component samples. Each of the one or more cross-component samples is in the second component of the current picture.

The video coder may apply the cross-component filter in various ways. For example, the video coder may determine the filtered value of the current sample according to a formula: $P'^c=\alpha P^{cc}+\beta$, where $P'^c$ is the filtered value of the current sample, $\alpha$ is the first parameter, $P^{cc}$ is a cross-component sample of the one or more cross-component samples, and $\beta$ is the second parameter.

In another example of applying the cross-component filter, the one or more cross-component samples include a plurality of cross-component samples, the first parameter is a first instance of the first parameter, and the video coder determines a plurality of first parameters ($\alpha_i$) that includes the first instance of the first parameter and one or more additional instances of the first parameter. In some examples, to derive the parameters utilized in the predefined linear or non-linear relation formula, the parameters may be calculated through the minimization of the mean square error between the current pixel plus its neighboring pixels and their corresponding cross-component pixels given a predefined relation between them. For instance, in one example, if the number of cross-component is 5 in the relation formula which means there are 5 $\alpha_i$ parameters and 1 $\beta$ parameter to be determined. In this example, the current pixel and at least 5 of its surrounding pixels and their corresponding cross-component samples are used to determine the parameters through the minimization of the mean square error between the current pixel plus its neighboring pixels and their corresponding cross-component pixels given a predefined relation between them. In this example, as part of applying the cross-component filter, the video coder determines the filtered value of the current sample according to a formula: $P'^c=\Sigma_i \alpha_i p_i^{cc}+\beta$, where $P'^c$ is the filtered value of the current sample, i is a pixel index, $\alpha_i$ is an i-th first parameter in the plurality of first parameters, $P_i^{cc}$ is an i-th cross-component sample of the plurality of cross-component samples, and $\beta$ is the second parameter.

In another example of applying the cross-component filter, the one or more cross-component samples include a plurality of cross-component samples and the first parameter is a first instance of the first parameter. In this example, the video coder determines a plurality of first parameters ($\alpha_i$) that includes the first instance of the first parameter and one or more additional instances of the first parameter. To derive the parameters utilized in the predefined linear or non-linear relation formula, the parameters may be calculated through the minimization of the mean square error between the current pixel plus its neighboring pixels and their corresponding cross-component pixels given a predefined relation between them. Each respective additional instance of the first parameter of the one or more additional instances of the first parameter is based on a value of a different corresponding sample of the first component. In this example, as part of applying the cross-component filter, the video coder determines the filtered value of the current sample according to a formula: $P'^c=\Sigma_i \alpha_i p_i^{cc}+\Sigma_j \gamma_j p_j^n+\beta$, where $P'^c$ is the filtered value of the current sample, i is a first pixel index, $\alpha_i$ is an i-th first parameter in the plurality of first parameters, $p_i^{cc}$ is an i-th cross-component sample of the plurality of cross-component samples, j is a second pixel index, $\gamma_i$ is an i-th third parameter in a plurality of third parameters, $p_j^n$ is a j-th sample that spatially neighbors the current sample, and $\beta$ is the second parameter.

The cross-component samples used in the cross-component filter may be defined or determined in various ways. For example, in instances where the current picture has a 4:4:4 color format or a 4:2:2 color format, the one or more cross-component samples may include a sample in the second component that is collocated with the current sample. In another example where the current picture has a 4:4:4 color format or a 4:2:2 color format, the second component may include a set of neighboring samples that spatially neighbor a collocated sample in the second component. In this example, the collocated sample in the second component is collocated with the current sample. Furthermore, in this example, the video coder applies a spatial noise-reduction filter to the collocated sample and the set of neighboring samples, thereby deriving a filtered collocated sample. In this example, the cross-component filter is based on the first parameter, the second parameter, and the filtered collocated sample. For instance, the video coder may use the filtered collocated sample as a value $p^{cc}$ of $p_i^{cc}$ in any of the formulas described elsewhere in this disclosure for applying the cross-component filter.

In some examples, the current picture has a 4:2:0 color format and the current sample is a chroma sample at a position between an upper luma sample above the chroma sample and a lower luma sample below the chroma sample. In this example, the upper luma sample and the lower luma sample are luma samples in the second component. Furthermore, in this example, the current sample is based on the first parameter, the second parameter, and either the upper luma sample or the lower luma sample. Thus, in this example, the video coder may use the upper luma sample or the lower luma sample as a value of $p^{cc}$ or $p_i^{cc}$ in any of the formulas described elsewhere in this disclosure for applying the cross-component filter.

In some examples, such as the example of FIG. 5A discussed above, the current picture has a 4:2:0 color format and the current sample is a chroma sample at a position between an upper luma sample above the chroma sample and a lower luma sample below the chroma sample. As in the previous example, the upper luma sample and the lower luma sample are luma samples in the second component of the current picture. However, in this example, the video coder uses a weighted average of the upper luma sample and the lower luma sample to determine a virtual luma sample. In this example, the current sample is based on the first parameter, the second parameter, and the virtual luma sample. Thus, in this example, the video coder may use the virtual luma sample as a value of $p^{cc}$ or $p_i^{cc}$ in any of the formulas described elsewhere in this disclosure for applying the cross-component filter.

In some example, such as the example of FIG. 5B discussed above, the current picture has a 4:2:0 color format and the current sample is a chroma sample at a position between six luma samples in the second component. In this example, the video coder may use a weighted average of the six luma samples to determine a virtual luma sample. In this example, the filtered value of the current sample is based on the first parameter, the second parameter, and the virtual luma sample. Thus, in this example, the video coder may use the virtual luma sample as a value of $p^{cc}$ or $p_i^{cc}$ in any of the formulas described elsewhere in this disclosure for applying the cross-component filter.

In some examples, the video coder may determine a modified filtered value of the current sample (1012). In such examples, the video coder may determine the modified filtered value of the current sample as a weighted sum of the value of the current sample and the filtered value of the current sample. In such examples, the value of the pixel in a final version of the current picture is based on the modified filtered value of the current sample.

The video coder may perform one or more actions after applying the cross-component filter or after determining that the cross-component filter is not enabled ("NO" branch of 1004) (1014). For instance, in an example where the video coder is a video decoder such as video decoder 30, the video decoder may output a final version of the current picture (1016). In this example, a value of a pixel in the final version of the current picture is based on the filtered value of the current sample. For example, the final version of the current picture may include an unaltered version of the filtered value of the current sample. In another example, the video coder may apply an additional filter (e.g., an SAO filter, an ALF, a deblocking filter, or other type of filter) to the filtered version of the current sample to generate a value of the current sample included in the final version of the current picture.

In examples where the video coder is a video encoder (e.g., video encoder 20) or a video decoder (e.g., video decoder 30), the video coder may use a final version of the current picture as a reference picture in encoding a later picture of the video data (1018). For instance, the video coder may use the final version of the current picture for inter prediction in the manner described elsewhere in this disclosure. In this example, a value of a pixel in the final version of the current picture is based on the filtered value of the current sample.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data performed by a video coding device, the method comprising:
generating a first component of a current picture of the video data, the first component comprising a first array of samples;
generating a second component of the current picture, the second component comprising a second array of samples separate from the first array of samples;
determining a first parameter, wherein the first parameter is based on a value of a current sample in the first component of the current picture;
determining a second parameter, wherein the second parameter is based on the value of the current sample;
applying a cross-component filter to the current sample as an in-loop filter after applying a deblocking filter, Sample Adaptive Offset (SAO) filter, or Adaptive Loop Filter (ALF) to a block of the current picture containing the current sample, thereby determining a filtered value of the current sample, wherein the cross-component filter is based on the first parameter, the second parameter, and one or more cross-component samples, each of the one or more cross-component samples being in the second component of the current picture; and performing one or more actions in a group consisting of:
outputting a final version of the current picture, wherein a value of a pixel in the final version of the current picture is based on the filtered value of the current sample; and
using the final version of the current picture as a reference picture in encoding a later picture of the video data, wherein a value of a pixel in the final version of the current picture is based on the filtered value of the current sample.

2. The method of claim 1, wherein applying the cross-component filter comprises determining the filtered value of the current sample according to a formula:

$$p'^c = \alpha P^{cc} + \beta,$$

where $P'^c$ is the filtered value of the current sample, a is the first parameter, $P^{cc}$ is a cross-component sample of the one or more cross-component samples, and $\beta$ is the second parameter.

3. The method of claim 1, wherein:
the one or more cross-component samples include a plurality of cross-component samples,
the first parameter is a first instance of the first parameter,
the method comprises determining a plurality of first parameters that includes the first instance of the first parameter and one or more additional instances of the first parameter, each respective additional instance of the first parameter of the one or more additional instances of the first parameter being based on a value of a different corresponding sample in the first component, and
applying the cross-component filter comprises determining the filtered value of the current sample according to a formula:

$$P'^c = \Sigma_i \alpha_i p_i^{cc} + \beta,$$

where $P'^c$ is the filtered value of the current sample, i is a pixel index, $\alpha_i$ is an i-th first parameter in the plurality of first parameters, $P_i^{cc}$ is an i-th cross-component sample of cross-component samples, and $\beta$ is the second parameter.

4. The method of claim 1, wherein:
the one or more cross-component samples include a plurality of cross-component samples,
the first parameter is a first instance of the first parameter,
the method comprises determining a plurality of first parameters that includes the first instance of the first parameter and one or more additional instances of the first parameter, each respective additional instance of the first parameter of the one or more additional instances of the first parameter being based on a value of a different corresponding sample in the first component, and
applying the cross-component filter comprises determining the filtered value of the current sample according to a formula:

$$P'^c = \Sigma_i \alpha_i p_i^{cc} + \Sigma_j \gamma_j p_j^n + \beta,$$

where $P'^c$ is the filtered value of the current sample, i is a first pixel index, $\alpha_i$ is an i-th first parameter in the plurality of first parameters, $p_i^{cc}$ is an i-th cross-component sample of the plurality of cross-component samples, j is a second pixel index, $\gamma_j$ is a j-th third parameter in a plurality of third parameters, $p_j^n$ is a j-th sample that spatially neighbors the current sample, and $\beta$ is the second parameter.

5. The method of claim 1, further comprising determining a modified filtered value of the current sample as a weighted sum of the value of the current sample and the filtered value of the current sample, wherein the value of the pixel in the final version of the current picture is based on the modified filtered value of the current sample.

6. The method of claim 1, wherein the current picture has a 4:4:4 color format or a 4:2:2 color format and the one or more cross-component samples include a sample in the second component that is collocated with the current sample.

7. The method of claim 1, wherein:
the current picture has a 4:4:4 color format or a 4:2:2 color format,
the second component includes a set of neighboring samples that spatially neighbor a collocated sample in the second component,
the collocated sample in the second component is collocated with the current sample,
the method further comprises applying a spatial noise-reduction filter to the collocated sample and the set of neighboring samples, thereby deriving a filtered collocated sample, and
the cross-component filter is based on the first parameter, the second parameter, and the filtered collocated sample.

8. The method of claim 1, wherein:
the current picture has a 4:2:0 color format,
the current sample is a chroma sample at a position between an upper luma sample above the chroma sample and a lower luma sample below the chroma sample, the upper luma sample and the lower luma sample being luma samples in the second component, and
the cross component filter is based on the first parameter, the second parameter, and either the upper luma sample or the lower luma sample.

9. The method of claim 1, wherein:
the current picture has a 4:2:0 color format,
the current sample is a chroma sample at a position between an upper luma sample above the chroma sample and a lower luma sample below the chroma sample, the upper luma sample and the lower luma sample being luma samples in the second component,
the method further comprises using a weighted average of the upper luma sample and the lower luma sample to determine a virtual luma sample, and
the cross-component filter is based on the first parameter, the second parameter, and the virtual luma sample.

10. The method of claim 1, wherein:
the current picture has a 4:2:0 color format,
the current sample is a chroma sample at a position between six luma samples in the second component,
the method further comprises using a weighted average of the six luma samples to determine a virtual luma sample, and
the cross-component filter is based on the first parameter, the second parameter, and the virtual luma sample.

11. The method of claim 1, wherein:
the first component comprises a current set of samples, the current set of samples including the current sample and a plurality of neighbor samples that spatially neighbor the current sample in the first component,
the one or more cross-component samples includes a plurality of cross-component samples, wherein, for each respective neighbor sample in the plurality of neighbor samples, the plurality of cross-component samples includes a sample in the second component corresponding to the respective neighbor sample, the plurality of cross-component samples further including a sample of the second component corresponding to the current sample, the first parameter is determined through minimization of a mean square error between the current set of samples and the plurality of cross-component samples given a predefined relation between the current set of samples and the plurality of cross-component samples, and the second parameter is determined through minimization of a mean square error between the current set of samples and the plurality of cross-component samples given the predefined relation between the current set of samples and the plurality of cross-component samples.

12. The method of claim 11, wherein in determining the first parameter and the second parameter more weight is placed on the current sample and a corresponding cross-component sample of the plurality of cross-component samples than the plurality of neighbor samples that spatially neighbor the current sample and the plurality of cross-component samples that correspond to the neighbor samples.

13. The method of claim 1, wherein at least one of:
determining the first parameter comprises using a Gaussian filter or an edge-preserved filter; or
determining the second parameter comprises using the Gaussian filter or the edge-preserved filter.

14. The method of claim 1, wherein the method further comprises:
including the filtered value of the current sample in a predictive block;
reconstructing the block by adding samples of the predictive block to corresponding samples of a residual block, wherein the block is in the first component; and
generating the final version of the current picture based on the reconstructed block.

15. A device for coding video data, the device comprising:
a memory configured to store the video data; and
one or more processors configured to:
generate a first component of a current picture of the video data, the first component comprising a first array of samples;
generate a second component of the current picture, the second component comprising a second array of samples separate from the first array of samples;
determine a first parameter, wherein the first parameter is based on a value of a current sample in the first component of the current picture;
determine a second parameter, wherein the second parameter is based on the value of the current sample;
apply a cross-component filter to the current sample as an in-loop filter after applying a deblocking filter, Sample Adaptive Offset (SAO) filter, or Adaptive Loop Filter (ALF) to a block of the current picture containing the current sample, thereby determining a filtered value of the current sample, wherein the cross-component filter is based on the first parameter, the second parameter, and one or more cross-component samples, each of the one or more cross-component samples being in the second component of the current picture; and
perform one or more actions in a group consisting of:
outputting a final version of the current picture, wherein a value of a pixel in the final version of the current picture is based on the filtered value of the current sample; and
using the final version of the current picture as a reference picture in encoding a later picture of the video data, wherein a value of a pixel in the final version of the current picture is based on the filtered value of the current sample.

16. The device of claim 15, wherein the one or more processors are configured such that, as part of applying the cross-component filter, the one or more processors determine the filtered value of the current sample according to a formula:

$$P'^c = \alpha P^{cc} + \beta,$$

where $P'^c$ is the filtered value of the current sample, $\alpha$ is the first parameter, $P^{cc}$ is a cross-component sample of the one or more cross-component samples, and $\beta$ is the second parameter.

17. The device of claim 15, wherein:
the one or more cross-component samples include a plurality of cross-component samples,
the first parameter is a first instance of the first parameter,
the one or more processors are configured to determine a plurality of first parameters that includes the first instance of the first parameter and one or more additional instances of the first parameter, each respective additional instance of the first parameter of the one or more additional instances of the first parameter being based on a value of a different corresponding sample in the first component, and
the one or more processors are configured such that, as part of applying the cross-component filter, the one or more processors determine the filtered value of the current sample according to a formula:

$$P'^c = \Sigma_i \alpha_i p_i^{cc} + \beta,$$

where $P'^c$ is the filtered value of the current sample, i is a pixel index, $\alpha_i$ is an i-th first parameter in the plurality of first parameters, $P_i^{cc}$ is an i-th cross-component sample of the plurality of cross-component samples, and $\beta$ is the second parameter.

18. The device of claim 15, wherein:
the one or more cross-component samples include a plurality of cross-component samples,
the first parameter is a first instance of the first parameter,
the one or more processors are configured to determine a plurality of first parameters that includes the first instance of the first parameter and one or more additional instances of the first parameter, each respective additional instance of the first parameter of the one or more additional instances of the first parameter being based on a value of a different corresponding sample in the first component, and
the one or more processors are configured such that, as part of applying the cross-component filter, the one or more processors determine the filtered value of the current sample according to a formula:

$$P'^c = \Sigma_i \alpha_i p_i^{cc} + \Sigma_j \gamma_j p_j^n + \beta,$$

where $P'^c$ is the filtered value of the current sample, i is a first pixel index, $\alpha_i$ is an i-th first parameter in the plurality of first parameters, $p_i^{cc}$ is an i-th cross-component sample of the plurality of cross-component samples, j is a second pixel index, $\gamma_j$ is an j-th third parameter in a plurality of third parameters, $p_j^n$ is a j-th sample that spatially neighbors the current sample, and $\beta$ is the second parameter.

19. The device of claim 15, wherein the one or more processors are further configured to determine a modified filtered value of the current sample as a weighted sum of the value of the current sample and the filtered value of the current sample, wherein the value of the pixel in the final version of the current picture is based on the modified filtered value of the current sample.

20. The device of claim 15, wherein the current picture has a 4:4:4 color format or a 4:2:2 color format and the one or more cross-component samples include a sample in the second component that is collocated with the current sample.

21. The device of claim 15, wherein:
the current picture has a 4:4:4 color format or a 4:2:2 color format,
the second component includes a set of neighboring samples that spatially neighbor a collocated sample in the second component,
the collocated sample in the second component is collocated with the current sample,
the one or more processors are further configured to apply a spatial noise-reduction filter to the collocated sample and the set of neighboring samples, thereby deriving a filtered collocated sample, and
the cross-component filter is based on the first parameter, the second parameter, and the filtered collocated sample.

22. The device of claim 15, wherein:
the current picture has a 4:2:0 color format,
the current sample is a chroma sample at a position between an upper luma sample above the chroma sample and a lower luma sample below the chroma sample, the upper luma sample and the lower luma sample being luma samples in the second component, and
the cross component filter is based on the first parameter, the second parameter, and either the upper luma sample or the lower luma sample.

23. The device of claim 15, wherein:
the current picture has a 4:2:0 color format,
the current sample is a chroma sample at a position between an upper luma sample above the chroma sample and a lower luma sample below the chroma sample, the upper luma sample and the lower luma sample being luma samples in the second component,
the one or more processors are further configured to use a weighted average of the upper luma sample and the lower luma sample to determine a virtual luma sample, and
the cross-component filter is based on the first parameter, the second parameter, and the virtual luma sample.

24. The device of claim 15, wherein:
the current picture has a 4:2:0 color format,
the current sample is a chroma sample at a position between six luma samples in the second component,
the one or more processors are further configured to use a weighted average of the six luma samples to determine a virtual luma sample, and
the cross-component filter is based on the first parameter, the second parameter, and the virtual luma sample.

25. The device of claim 15, wherein:
the first component comprises a current set of samples, the current set of samples including the current sample and a plurality of neighbor samples that spatially neighbor the current sample in the first component,
the one or more cross-component samples includes a plurality of cross-component samples, wherein, for each respective neighbor sample in the plurality of neighbor samples, the plurality of cross-component samples includes a sample in the second component corresponding to the respective neighbor sample, the plurality of cross-component samples further including a sample of the second component corresponding to the current sample,
the first parameter is determined through minimization of a mean square error between the current set of samples and the plurality of cross-component samples given a predefined relation between the current set of samples and the plurality of cross-component samples, and
the second parameter is determined through minimization of a mean square error between the current set of samples and the plurality of cross-component samples given the predefined relation between the current set of samples and the plurality of cross-component samples.

26. The device of claim 15, wherein the one or more processors are further configured to:
include the filtered value of the current sample in a predictive block;
reconstruct the block by adding samples of the predictive block to corresponding samples of a residual block, wherein the block is in the first component; and
generate the final version of the current picture based on the reconstructed block.

27. The device of claim 15, wherein the one or more processors are further configured to:
receive the video data at a receiver of a wireless communication device;
store the video data in a memory of the wireless communication device; and
process the video data on one or more processors of the wireless communication device.

28. The device of claim 15, wherein the device comprises a wireless communication device, further comprising a transmitter configured to transmit encoded video data.

29. A device for coding video data, the device comprising:
means for generating a first component of a current picture of the video data, the first component comprising a first array of samples;
means for generating a second component of the current picture, the second component comprising a second array of samples separate from the first array of samples;
means for determining a first parameter, wherein the first parameter is based on a value of a current sample in the first component of the current picture;
means for determining a second parameter, wherein the second parameter is based on the value of the current sample;
means for applying a cross-component filter to the current sample as an in-loop filter after applying a deblocking filter, Sample Adaptive Offset (SAO) filter, or Adaptive Loop Filter (ALF) to a block of the current picture containing the current sample, thereby determining a filtered value of the current sample, wherein the cross-component filter is based on the first parameter, the second parameter, and one or more cross-component samples, each of the one or more cross-component samples being in the second component of the current picture; and
means for performing one or more actions in a group consisting of:
outputting a final version of the current picture, wherein a value of a pixel in the final version of the current picture is based on the filtered value of the current sample; and
using the final version of the current picture as a reference picture in encoding a later picture of the video data, wherein a value of a pixel in the final version of the current picture is based on the filtered value of the current sample.

30. A computer-readable storage medium having instructions stored thereon, wherein execution of the instructions causes a video coding device to:
  generate a first component of a current picture of the video data, the first component comprising a first array of samples;
  generate a second component of the current picture, the second component comprising a second array of samples separate from the first array of samples;
  determine a first parameter, wherein the first parameter is based on a value of a current sample in the first component of the current picture;
  determine a second parameter, wherein the second parameter is based on the value of the current sample;
  apply a cross-component filter to the current sample as an in-loop filter after applying a deblocking filter, Sample Adaptive Offset (SAO) filter, or Adaptive Loop Filter (ALF) to a block of the current picture containing the current sample, thereby determining a filtered value of the current sample, wherein the cross-component filter is based on the first parameter, the second parameter, and one or more cross-component samples, each of the one or more cross-component samples being in the second component of the current picture; and
  perform one or more actions in a group consisting of:
    outputting a final version of the current picture, wherein a value of a pixel in the final version of the current picture is based on the filtered value of the current sample; and
    using the final version of the current picture as a reference picture in encoding a later picture of the video data, wherein a value of a pixel in the final version of the current picture is based on the filtered value of the current sample.

* * * * *